(12) United States Patent
Watanabe

(10) Patent No.: US 12,065,597 B2
(45) Date of Patent: Aug. 20, 2024

(54) ADHESIVE TAPE

(71) Applicant: DIC Corporation, Tokyo (JP)

(72) Inventor: Daisuke Watanabe, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 290 days.

(21) Appl. No.: 17/629,891

(22) PCT Filed: Aug. 27, 2020

(86) PCT No.: PCT/JP2020/032266
§ 371 (c)(1),
(2) Date: Jan. 25, 2022

(87) PCT Pub. No.: WO2021/039877
PCT Pub. Date: Mar. 4, 2021

(65) Prior Publication Data
US 2022/0251423 A1 Aug. 11, 2022

(30) Foreign Application Priority Data

Aug. 30, 2019 (JP) ................................. 2019-159016

(51) Int. Cl.
*C09J 7/24* (2018.01)
*C08K 3/22* (2006.01)
*C09J 11/04* (2006.01)
*C09J 11/08* (2006.01)
*C09J 133/08* (2006.01)

(52) U.S. Cl.
CPC .............. *C09J 7/243* (2018.01); *C08K 3/22* (2013.01); *C09J 7/245* (2018.01); *C09J 11/04* (2013.01); *C09J 11/08* (2013.01); *C09J 133/08* (2013.01); *C08K 2003/2227* (2013.01); *C08K 2201/003* (2013.01); *C09J 2301/124* (2020.08); *C09J 2301/312* (2020.08); *C09J 2301/408* (2020.08); *C09J 2301/502* (2020.08); *C09J 2409/001* (2013.01); *C09J 2423/041* (2013.01); *C09J 2423/101* (2013.01); *C09J 2425/001* (2013.01); *C09J 2433/00* (2013.01); *C09J 2453/001* (2013.01); *C09J 2483/00* (2013.01)

(58) Field of Classification Search
None
See application file for complete search history.

(56) References Cited

U.S. PATENT DOCUMENTS

| | | |
|---|---|---|
| 6,680,096 B1 | 1/2004 | Luhmann et al. |
| 2004/0048062 A1 | 3/2004 | Nonaka et al. |
| 2014/0004288 A1 | 1/2014 | Wakayama et al. |

FOREIGN PATENT DOCUMENTS

| | | |
|---|---|---|
| JP | 2001-89726 A | 4/2001 |
| JP | 2002-105217 A | 4/2002 |
| JP | 2004-99758 A | 4/2004 |
| JP | 2010-207406 A | 9/2010 |
| JP | 2011-252164 A | 12/2011 |
| WO | 2012/081561 A1 | 6/2012 |
| WO | 2016/047436 A1 | 3/2016 |

OTHER PUBLICATIONS

Omnexus, Technical datasheet for S.O.ETM L609, date accessed: Jan. 9, 2024 <https://omnexus.specialchem.com/product/e-asahi-kasei-s-o-e-1609> (Year: 2024).*
International Search Report dated Nov. 10, 2020, issued in counterpart International Application No. PCT/JP2020/032266 (2 pages).

* cited by examiner

*Primary Examiner* — Cheng Yuan Huang
(74) *Attorney, Agent, or Firm* — WHDA, LLP

(57) ABSTRACT

An object of the present invention is to provide an adhesive tape that can be removed from an adherend more easily and more rapidly. The adhesive tape of the present invention includes a base material layer, and adhesive layers on both sides of the base material layer, the base material layer has a thickness of 10 to 100 μm, a breaking strength of 20 to 90 MPa, a breaking elongation of 400% to 1,500%, and a 100% modulus of 1 to 5 MPa, and an adhesive composition forming the adhesive layers contains 1% to 40% by mass of filler particles having an average particle diameter of 0.1 to 40 μm with respect to 100% by mass of the adhesive composition.

13 Claims, 2 Drawing Sheets

ADHESIVE TAPE

TECHNICAL FIELD

The present invention relates to an adhesive tape.

BACKGROUND ART

Since an adhesive tape has excellent workability and high adhesive reliability, it is widely used as a joining means in various industrial fields such as OA equipment, IT or home appliances, and automobiles for fixing parts, temporarily fixing parts, labels displaying product information, and the like (for example, PTL 1).

CITATION LIST

Patent Literature

PTL 1: JP-A-2001-89726

SUMMARY OF INVENTION

Technical Problem

Meanwhile, in recent years, from a viewpoint of environmental protection, there is an increasing demand for recycling and reusing of used products or products to be discarded in various industrial fields such as home appliances and automobiles. In a case of recycling and reusing various products, the product needs to be disassembled and each part in the product needs to be removed. In a case of removing each part, it is necessary to perform an operation of peeling an adhesive tape used for fixing parts and labels off. However, in recent years, adhesive tapes have been provided in various places in the product, and the operation of peeling the adhesive tapes off has become complicated. In addition, in a product in which a large number of parts are mounted at a high density, in order to remove one part from the dense parts, it was necessary to peel the adhesive tape off by pulling it from an attachment surface in a direction of a high angle (for example, 60° or more), but in a case of pulling it at a high angle as described above, a load was applied to the adhesive tape, and particularly, in a case of attempting to more rapidly elongate the adhesive tape, the adhesive tape was torn off in some cases.

Therefore, in a step of removing the adhesive tape, it is desired to reduce work cost by making it possible to remove the adhesive tape more easily and more rapidly.

Accordingly, the present invention has been made in view of the above problems, and an object of the present invention is to provide an adhesive tape that can be easily and rapidly removed from an adherend.

Solution to Problem

[1] An adhesive tape including: a base material layer; and adhesive layers on both sides of the base material layer, in which the base material layer has a thickness of 10 to 100 μm, a breaking strength of 20 to 90 MPa, a breaking elongation of 400% to 1,500%, and a 100% modulus of 1 to 5 MPa, and
an adhesive composition forming the adhesive layers contains 1% to 40% by mass of filler particles having an average particle diameter of 0.1 to 40 μm with respect to 100% by mass of the adhesive composition.

[2] The adhesive tape according to [1], in which the base material layer has a rubber hardness of 60 to 90 A.

[3] The adhesive tape according to [1] or [2], in which the base material layer has the breaking elongation of 400% to 1,000%.

[4] The adhesive tape according to any one of [1] to [3], in which the base material layer contains a styrene-based block copolymer or a hydrogenated product of the styrene-based block copolymer.

[5] The adhesive tape according to any one of [1] to [4], in which the base material layer contains a hydrogenated product of a block copolymer configured with at least a hard segment X and a soft segment Y, and the soft segment Y in the hydrogenated product is configured with a random copolymer of a linear structural unit and a structural unit having a side chain.

[6] The adhesive tape according to [1] to [5], in which the base material layer contains a hydrogenated product of a block copolymer configured with at least a polymer block (A) and a polymer block (B),
the polymer block (A) has a structural unit derived from a styrene-based compound as a main component, and
the polymer block (B) is a block configured with a random copolymer of a linear hydrogenated butadiene structural unit (b1) and a hydrogenated isoprene structural unit (b2) having a side chain.

[7] The adhesive tape according to any one of [1] to [6], in which the base material layer contains a styrene-ethylene/butadiene-styrene copolymer (SEBS) or a styrene-ethylene-ethylene/propylene-styrene block copolymer (SEEPS) as a main component.

[8] The adhesive tape according to any one of [1] to [7], in which the filler particles have the content of 3.5% to 40% by mass with respect to 100% by mass of the adhesive composition.

Advantageous Effects of Invention

The present invention can provide an adhesive tape that can be removed from an adherend more easily and more rapidly.

DESCRIPTION OF EMBODIMENTS

Figure 1:
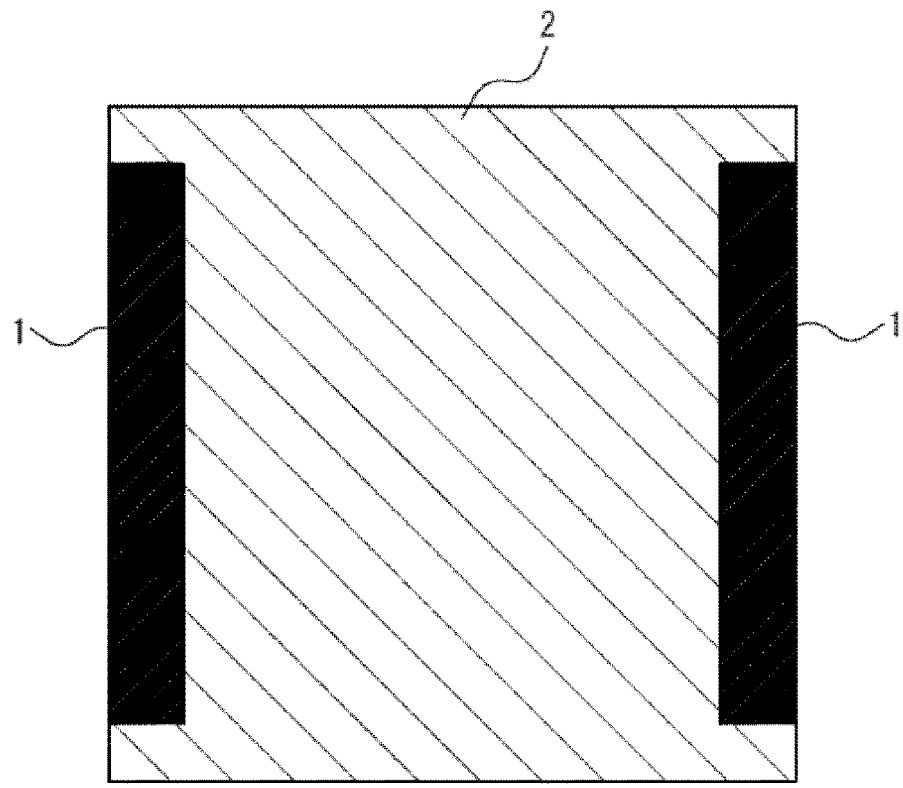
FIG. 1 is a schematic explanatory view of a method for attaching an adhesive tape 1 to an acrylic plate 2 in a case of evaluating impact resistance in an example.

Hereinafter, embodiments of the present invention (hereinafter referred to as "the present embodiments") will be described in detail, but the present invention is not limited to the present embodiments.

"Adhesive Tape"

An adhesive tape of the present embodiment is an adhesive tape including a base material layer and adhesive layers on both sides of the base material layer. In addition, the base material layer of the adhesive tape of the present embodiment has a thickness of 10 to 100 μm, a breaking strength of 20 to 90 MPa, a breaking elongation of 400% to 1,500%, and a 100% modulus of 1 to 5 MPa. Further, an adhesive composition forming the adhesive layer of the adhesive tape of the present embodiment contains 1% to 40% by mass of filler particles having an average particle diameter of 0.1 to 40 µm with respect to 100% by mass of the adhesive composition.

By having such a configuration, the adhesive tape of the present embodiment can be removed more easily and more rapidly from an adherend (object to which the adhesive tape is attached). Specifically, the base material layer of the adhesive tape of the present embodiment has the breaking strength of 20 to 90 MPa, the breaking elongation of 400% to 1,500%, and the 100% modulus of 1 to 5 MPa, and accordingly, in an initial stage when peeling the adhesive tape off from the adherend (initial stage of elongation of the adhesive tape), a worker can pull it with a comparatively weak force, and through a peeling step, it is possible to peel the adhesive tape off from the adherend without tearing even if the worker pulls it with a comparatively high speed (re-peeling can be performed). In addition, since the base material layer of the adhesive tape of the present embodiment has a thickness of 10 to 100 µm, it is possible to ensure a strength of the adhesive tape and ease of pulling of the adhesive tape. Further, the adhesive layer of the adhesive tape of the present embodiment is formed of an adhesive composition containing 1% to 40% by mass of filler particles having an average particle diameter of 0.1 to 40 µm. As a result, in a case where the adhesive tape is pulled to be peeled off from the adherend, the filler particles are exposed from the adhesive layer thinned by the elongation of the adhesive tape, the adhesive strength of the adhesive layer to the adherend is reduced, and the adhesive tape can be easily peeled off.

Therefore, according to the adhesive tape of the present embodiment, it is possible to more easily and more rapidly remove the adhesive tape from the adherend.

<Base Material Layer>

In the present embodiment, the adhesive tape includes the base material layer between the adhesive layers on both sides, and the base material layer has the thickness of 10 to 100 µm, the breaking strength of 20 to 90 MPa, the breaking elongation of 400% to 1,500% and the 100% modulus of 1 to 5 MPa.

In the present embodiment, the base material layer is not particularly limited as long as it has the characteristics, can be appropriately selected from well-known materials that can be used for the adhesive tape, and preferably contains the following materials for base material, and if necessary, other components may be further contained.

The base material layer may have a single-layer structure, or may have a multi-layer structure of two layers, three layers, or more layers.

In the present embodiment, the base material layer has the breaking strength of 20 to 90 MPa, preferably 30 to 90 MPa, and more preferably 40 to 90 MPa. Since the breaking strength is 20 MPa or more, in a case where the adhesive tape is peeled off from the adherend, it is possible to peel the adhesive tape off from the adherend without tearing, even if the worker pulls it at a comparatively high speed. In addition, since the breaking strength is 90 MPa or less, it is possible to prevent an excessive increase of a stress in a case where the worker pulls the adhesive tape.

The breaking strength of the base material layer in the adhesive tape indicates a stress value measured, in a case where the base material layer is punched into a dumbbell shape with a marked line length of 20 mm and a width of 5 mm, and pulled and broken in a length direction at a tensile speed of 500 mm/min by using TENSILON tensile testing machine (model name: RTF-1210, manufactured by A & D Company, Limited) under conditions of a measurement atmosphere of 23° C. and 50% RH.

In addition, the breaking strength can be adjusted by a method for appropriately selecting a material and elongating it in a step of producing a base material layer.

In the present embodiment, the base material layer has the breaking elongation of 400% to 1,500%, preferably 400% to 1,200%, and more preferably 400 to 1,000%. Since the breaking elongation is 400% or more, even in a case where the adhesive tape is firmly adhered to the adherend, the stress when peeling the adhesive tape off does not excessively increase. In addition, since the breaking elongation is 1,500% or less, in a case of peeling the adhesive tape off, an elongation distance does not excessively increase, and accordingly, it is possible to work in a small space.

The breaking elongation of the base material layer in the adhesive tape indicates a tensile elongation rate measured, in a case where the base material layer is punched into a dumbbell shape with a marked line length of 20 mm and a width of 5 mm, and pulled and broken in the length direction at the tensile speed of 500 mm/min by using TENSILON tensile testing machine (model name: RTF-1210, manufactured by A & D Company, Limited) under conditions of a measurement atmosphere of 23° C. and 50% RH.

In addition, the breaking elongation can be adjusted by a method for appropriately selecting a material and elongating it in a step of producing a base material layer.

In the present embodiment, the base material layer has the 100% modulus of 1 to 5 MPa, preferably 1 to 4.5 MPa, and more preferably 1 to 4 MPa. Since the 100% modulus is 1 MPa or more, it is possible to suppress defects due to shape deformation such as displacement when a load is applied to the adhesive tape or the adherend. In addition, since the 100% modulus is 5 MPa or less, in an initial stage of peeling the adhesive tape off from the adherend, the worker can pull it with a comparatively weak force.

The 100% modulus of the base material layer in the adhesive tape indicates a stress value measured, in a case where the base material layer is punched into a dumbbell shape with a marked line length of 20 mm and a width of 5 mm, and pulled in a length direction at a tensile speed of 500 mm/min by using TENSILON tensile testing machine (model name: RTF-1210, manufactured by A & D Company, Limited) under conditions of a measurement atmosphere of 23° C. and 50% RH and the elongation reaches 100%.

In addition, the 100% modulus can be adjusted by a method for appropriately selecting a material and elongating it in a step of producing a base material layer.

In the present embodiment, the base material layer preferably has a rubber hardness of 60 to 90 A, more preferably 60 to 85 A, and further preferably 65 to 85 A. Since the rubber hardness is 60 A or more, it is possible to effectively prevent the adhesive tape from being torn in a case where the adhesive tape is elongated and peeled off. In addition, since the rubber hardness is 90 A or less, the base material layer becomes soft, and for example, in a case where the adherend to which the adhesive tape is attached is dropped, the adhesive tape easily absorbs the impact, and the adherend can be protected from impact (impact resistance of the adhesive tape can be improved).

The rubber hardness of the base material layer in the adhesive tape is Shore A hardness and indicates a value measured based on JIS K6253 using a durometer (spring type rubber hardness tester) (model name: GS-719G, manufactured by TECLOCK Co., Ltd.).

In addition, the rubber hardness can be adjusted by a method for selecting an appropriate material by, for example, changing a molecular weight of a resin or, in a case of containing a styrene monomer unit, changing the monomer unit.

The base material layer has the thickness of 10 to 300 μm, preferably 20 to 250 μm, and more preferably 30 to 200 μm. Since a case where the thickness is 10 μm or more, it is possible to ensure the strength of the adhesive tape, and since the thickness is 300 μm or less, it is possible to prevent the adhesive tape becoming difficult to be pulled due to an excessive increase of thickness thereof.

In the present specification, a "thickness of the base material layer" indicates an average value of measured values of thicknesses of random 5 points in the base material layer which are measured using TH-104, a thickness measuring machine for paper and film (manufactured by Tester Sangyo Co., Ltd.).

A ratio of the thicknesses of the adhesive layer to the base material layer is not particularly limited and can be appropriately selected according to the purpose. The ratio of the thickness of the adhesive layer to the thickness of the base material layer represented by [thickness of the adhesive layer/thickness of the base material layer] is preferably 1/5 to 5/1, more preferably 1/3 to 3/1, and even more preferably 1/2 to 2/1. In a case where the ratio of the thickness of the adhesive layer to the thickness of the base material layer is within the preferable range, it is possible to obtain excellent adhesiveness and re-peeling property (ease of peeling) of the adhesive tape. On the other hand, in a case where the ratio is larger than 5/1, only the adhesive layer may remain on the adherend in a re-peeling step of the adhesive tape. In addition, in a case where the ratio is smaller than 1/5, there is a concern that the adhesive layer cannot follow a surface of the adherend, in a case where the surface has an uneven shape or the like, thereby decreasing the adhesive strength.

<<Material for Base Material>>

The material for the base material is not particularly limited as long as the base material layer having the specific physical properties can be obtained, and examples thereof include a styrene-based resin such as polystyrene, a styrene-isoprene copolymer, a styrene-isoprene-styrene copolymer, a styrene-isoprene-butadiene-styrene copolymer, a styrene-butadiene-styrene copolymer, a styrene-ethylene-butylene copolymer, a styrene-ethylene-propylene copolymer, a styrene-butadiene-isoprene copolymer, a styrene-ethylene-ethylene/propylene-styrene block copolymer, a styrene-ethylene/butadiene-styrene copolymer, or the like; a polyurethane resin such as ester-based polyurethane, ether-based polyurethane, or the like; a polyolefin resin such as polyethylene, polypropylene, or the like; a polyester resin such as polyethylene terephthalate, polybutylene terephthalate, polyethylene naphthalate, or the like; polystyrene; polycarbonate; polymethylpentene; polysulfone; polyetheretherketone; polyethersulfone; polyetherimide; a polyimide film; a fluororesin; nylon; an acrylic resin; and the like. These may be used alone or in a combination of two or more thereof.

Among these, the styrene-based resin is preferable, since the specific physical property is easily obtained.

The styrene-based resin is preferably a styrene-based block copolymer and/or a hydrogenated product of the styrene-based block copolymer such as a styrene-isoprene copolymer, a styrene-isoprene-styrene copolymer, a styrene-isoprene-butadiene-styrene copolymer, a styrene-butadiene-styrene copolymer, a styrene-butadiene-isoprene copolymer, a styrene-ethylene/butadiene-styrene copolymer, a styrene-ethylene-ethylene/propylene-styrene block copolymer, and the like, and more specifically, the styrene-based resin is preferably a hydrogenated product of a block copolymer configured with at least a polymer block (A) having a structural unit derived from a styrene-based compound (hereinafter, abbreviated as a styrene-based compound unit) as a main component, and a polymer block (B) having a structural unit derived from isoprene (hereinafter, abbreviated as isoprene unit), a structural unit derived from butadiene (hereinafter, abbreviated as butadiene unit), or a structural unit derived from a mixture of isoprene and butadiene (hereinafter, abbreviated as isoprene and butadiene unit) as a main component.

In the following description, the isoprene unit, the butadiene unit, and the isoprene and butadiene unit in the polymer block (B) constituting the styrene-based block copolymer may be collectively referred to as a structural unit derived from conjugated diene or a conjugated diene unit. In addition, the hydrogenated product of the block copolymer may be referred to as a hydrogenated block copolymer or a hydrogenated type block copolymer, and the structural unit derived from the conjugated diene hydrogenated in the polymer block (B) in the hydrogenated block copolymer may be referred to as a hydrogenated conjugated diene unit. Further, in the styrene-based block copolymer, the polymer block (A) having the styrene-based compound unit as a main component is a hard segment, and the polymer block (B) having a conjugated diene unit or a hydrogenated conjugated diene unit as a main component is a soft segment.

Hereinafter, the polymer block (A) and the polymer block (B) will be described in order.

The polymer block (A) has the styrene-based compound unit as a main component. The expression "having . . . as a main component" used herein means that the polymer block (A) contains 50% by mass or more of styrene unit based on a total mass. The content of the styrene-based compound unit in the polymer block (A) is more preferably 70% by mass or more, more preferably 90% by mass or more, particularly preferably 95% by mass or more, and may be substantially 100% by mass, based on the total mass of the polymer block (A).

Examples of the styrene-based compound as a raw material constituting the polymer block (A) include styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, 4-(phenylbutyl)styrene, and the like. These aromatic vinyl compounds may be used alone or in a combination of two or more thereof. Among these, styrene, α-methylstyrene, and a mixture thereof are preferable, and styrene is more preferable, from a viewpoint of balance between manufacturing cost and physical property.

However, as long as it does not interfere the object and the effect of the present invention, the polymer block (A) may contain the structural unit derived from an unsaturated monomer other than the styrene-based compound (hereinafter, abbreviated as other unsaturated monomer unit) in a proportion of 10% by mass or less. Examples of the other unsaturated monomer include at least one kind selected from the group consisting of butadiene, isoprene, 2,3-dimethylbutadiene, 1,3-pentadiene, 1,3-hexadiene, isobutylene, methyl methacrylate, methylvinyl ether, N-vinylcarbazol, β-pinene, 8,9-p-mentene, dipentene, methylenenorbornene, 2-methylenetetrahydrofuran, and the like. A bonding form in a case where the polymer block (A) contains the other unsaturated monomer unit is not particularly limited and may be random or tapered.

The styrene-based resin may include at least one polymer block (A). In a case where the styrene-based resin includes two or more polymer blocks (A), the polymer blocks (A) may be the same as each other or different from each other. In this specification, the expression that "the polymer blocks are different from each other" means that at least one of a monomer unit constituting the polymer block, a weight average molecular weight, a molecular weight distribution, a stereoregularity, and a ratio of each monomer unit and a shape of copolymerization (random, gradient, and block), in a case of including a plurality of monomer units, is different.

The weight average molecular weight of at least one polymer block (A) of the polymer blocks (A) contained in the styrene-based resin is preferably 3,000 to 15,000 and more preferably 3,000 to 12,000. Since the styrene-based resin includes at least one polymer block (A) having the weight average molecular weight within the range, a mechanical strength of the styrene-based resin containing the styrene-based resin is further improved.

In addition, the total weight average molecular weight of the polymer block (A) contained in the styrene-based resin is preferably 3,500 to 15,000, more preferably 4,500 to 15,000, even more preferably 4,500 to 12,000, particularly preferably 5,000 to 11,000, and most preferably 8,000 to 11,000, from the viewpoint of mechanical strength.

All the "weight average molecular weight" described in this specification and claims is a weight average molecular weight converted in terms of standard polystyrene obtained by gel permeation chromatography (GPC) measurement, and is a value measured according to a method described in examples in detail. The weight average molecular weight of each polymer block (A) contained in the styrene-based resin can be obtained by measuring a sampled liquid each time the polymerization of each polymer block is completed in the production step. In addition, for example, in a case of a triblock copolymer having an A-B-A structure, the weight average molecular weights of the first polymer block A and the polymer block B are obtained by the method, and these are subtracted from the weight average molecular weight of the styrene-based resin, and accordingly, the weight average molecular weight of the second polymer block A can be obtained. Further, as another method, in a case of the triblock copolymer having an A-B-A structure, the total weight average molecular weight of the polymer block (A) is calculated from the weight average molecular weight of the styrene-based resin and the total content of the polymer block (A) found in the 1H-NMR measurement, the weight average molecular weight of the first deactivated polymer block A is calculated by the GPC measurement, and the weight average molecular weight of the second polymer block A can also be obtained by subtracting these.

The content of the polymer block (A) in the styrene-based resin (in a case of including the plurality of polymer blocks (A), the total content thereof) is preferably 5% to 75% by mass, more preferably 5% to 50% by mass, and even more preferably 10% to 40% by mass, with respect to the total amount of the styrene-based resin. In a case where the content of the polymer block (A) is within the range, the obtained styrene-based resin has more excellent flexibility.

The content of the polymer block (A) in the styrene-based resin is a value obtained by $^1$HNMR spectrum.

The polymer block (B) has the isoprene unit, the butadiene unit, or the isoprene and butadiene unit as a main component. The expression "having . . . as a main component" used herein means that the polymer block (B) contains 50% by mass or more of structural unit based on a total mass. The content of the structural unit derived from isoprene and/or butadiene in the polymer block (B) is more preferably 70% by mass or more, more preferably 90% by mass or more, particularly preferably 95% by mass or more, and may be substantially 100% by mass, based on the total mass of the polymer block (B).

In addition, the polymer block (B) may contain a structural unit derived from at least one kind selected from, for example, 2,3-dimethylbutadiene, 1,3-pentadiene, 1,3-hexadiene, and the like as a structural unit derived from a conjugated diene compound other than isoprene and butadiene.

As described above, the polymer block (B) has the isoprene unit, the butadiene unit, or the isoprene and butadiene unit as a main component, and it is preferable that the butadiene unit or the isoprene and butadiene unit is used as a main component from a viewpoint of excellent mechanical strength (particularly rubber elasticity) of the styrene-based resin. In addition, it is more preferable that it is configured with the isoprene and butadiene unit as a main component. The mixing ratio of isoprene and butadiene is not particularly limited, but from a viewpoint of improving various performances, the mixing ratio isoprene/butadiene is preferably 10/90 to 90/10, more preferably 30/70 to 70/30, and even more preferably 40/60 to 60/40 in terms of mol ratio.

In addition, in a case where the polymer block (B) is configured with the isoprene and butadiene unit as a main component, the bonding form thereof is not particularly limited, and can be random, tapered, completely alternating, partially blocked, blocked, or a combination of two or more kinds thereof.

As the bonding form of each of isoprene and butadiene constituting the polymer block (B), the bonding form of butadiene can be 1,2-bonding and 1,4-bonding, and the bonding form of isoprene can be 1,2-bonding, 3,4-bonding, and 1,4-bonding. In the styrene-based resin, the total content of 1,2-bonding and 3,4-bonding in the polymer block (B) is preferably 40 mol % or more, more preferably 60 mol % or more, even more preferably 80 mol % or more, still more preferably 85 mol % or more, and most preferably 90 mol % or more. In addition, it is preferably 95 mol % or less.

In a case where the polymer block (B) is composed of only butadiene, the "total content of 1,2-bonding and 3,4-bonding" is applied by changing to "content of 1,2-bonding". The contents of 1,2-bonding and 3,4-bonding are values calculated by $^1$H-NMR measurement.

In the present specification, in a case where the polymer block (B) contains the isoprene unit, the total amount of the 1,2-bonding amount and the 3,4-bonding amount is referred to as a vinyl bonding amount, and in a case where the polymer block (B) is composed of the butadiene unit, the 1,2-bonding amount may be referred to as a vinyl bonding amount.

As long as it does not interfere the object and the effect of the present invention, the polymer block (B) may generally contain preferably 30% by mass or less, or more preferably 10% by mass or less of structural unit derived from polymerizable monomer other than the isoprene unit and butadiene unit with respect to the total mass of the polymer block (B). Examples of the other polymerizable monomer preferably include at least one kind of compound selected from the group consisting of styrene, α-methylstyrene, o-methylstyrene, m-methylstyrene, p-methylstyrene, p-t-butylstyrene, 2,4-dimethylstyrene, an aromatic vinyl compound such as vinylnaphthalene and vinylanthracene, methyl methacrylate, methylvinyl ether, N-vinylcarbazol, β-pinene, 8,9-p-mentene, dipentene, methylenenorbornene, 2-methylenetetrahydrofuran, and the like. In a case where the polymer block (B)

contains the structural unit derived from a monomer of a polymer other than the isoprene unit and the butadiene unit, the bonding form thereof is not particularly limited and may be random or tapered.

The styrene-based resin may include at least one polymer block (B) described above. In a case where the styrene-based resin includes two or more polymer blocks (B), the polymer blocks (B) may be the same as each other or different from each other.

The hydrogenation rate of the polymer block (B) is preferably 50 mol % or more, more preferably 75 mol % or more, even more preferably 95 mol % or more.

The hydrogenation rate is a value obtained by calculating the amount of carbon-carbon double bond in the structural unit derived from the conjugated diene compound in the polymer (B) using $^1$H-NMR spectrum, and the more specific conditions are as described in examples.

The bonding form of the polymer block (A) and the polymer block (B) in the styrene-based resin is not particularly limited, and may be any bonding form of a linear, branched, and radial form, or a combination of two or more thereof. Among these, the bonding form of the polymer block (A) and the polymer block (B) is preferably a linear form, and as an example, in a case where the polymer block (A) is defined as A and the polymer block (B) is defined as B, a diblock copolymer represented as A-B, a triblock copolymer represented as A-B-A, a tetrablock copolymer represented as A-B-A-B, a pentablock copolymer represented as A-B-A-B-A, and an (A-B) nX type copolymer (X represents a coupling agent residue and n represents an integer of 3 or more) can be used. Among these, a linear triblock copolymer or a diblock copolymer is preferable, and an A-B-A type triblock copolymer is preferably used.

Here, in the present specification, in a case where the same kind of polymer blocks are linearly bonded via a bifunctional coupling agent or the like, the entire bonded polymer block is treated as one polymer block. Accordingly, including the above examples, the polymer block, which should be strictly described as Y-X-Y (where X represents a coupling agent residue), is shown as Y as a whole, except for a case where it is particularly necessary to distinguish from a single polymer block Y. In the present specification, since this kind of polymer block containing the coupling agent residue is treated as described above, for example, a block copolymer which contains the coupling agent residue and should be strictly described as A-B-X-B-A (X represents a coupling agent residue), is shown as A-B-A and is treated as an example of the triblock copolymer.

In addition, the styrene-based resin may contain a polymer block (C) consisting of other polymerizable monomers other than the polymer block (A) and the polymer block (B), as long as the object of the present invention is not impaired. In this case, in a case where the polymer block (C) is represented by C, examples of the structure of the block copolymer include an A-B-C type triblock copolymer, an A-B-C-A type tetrablock copolymer, an A-B-A-C type tetrablock copolymer, and the like.

In the present embodiment, the polymer block (B) present in the styrene-based resin and/or the polymer block (C) that can be optionally present preferably has a structural unit having crystallinity such as an ethylene unit and a propylene unit. In addition, the polymer block (B) and/or the polymer block (C) that can be optionally present preferably has side chains at the same time in order to prevent the crystallinity from excessively increasing. The styrene-based resin having these structural units exhibits excellent breaking strength.

The weight average molecular weight of the styrene-based resin is preferably 50,000 to 500,000, more preferably 60,000 to 400,000, even more preferably 65,000 to 300,000, and particularly preferably 70,000 to 115,000.

As long as the object and the effect of the present invention are not impaired, the styrene-based resin may include one kind or two or more kinds of a functional group such as a carboxyl group, a hydroxyl group, an acid anhydride group, an amino group, and an epoxy group, or may not include the functional group in a molecular chain and/or a molecular terminal.

For the fluidity of the styrene-based resin, a melt flow rate measured at 230° C. and 21.6 N is preferably 0.01 to 300 g/10 minutes. In a case of film forming by a T-die method or an inflation method, the melt flow rate is more preferably 0.01 to 100 g/10 minutes, and in a case of tube forming or injection molding by an extrusion method, the melt flow rate is more preferably 0.1 to 100 g/10 minutes. All "melt flow rates" in the present specification are values measured based on JIS K 7210 (1999).

In the present embodiment, the styrene-based resin includes a styrene-ethylene-ethylene/propylene-styrene block copolymer (SEEPS) or a styrene-(ethylene-butylene)-styrene block copolymer (SEBS) which is a hydrogenated block copolymer.

In addition, regardless of whether it is a styrene-based resin or not, in the present embodiment, it is preferable that the base material layer contains a hydrogenated product of a block copolymer (may be referred to as a hydrogenated block copolymer) configured with at least a hard segment X and a soft segment Y, and the soft segment Y in the hydrogenated product is configured with a random copolymer of a linear structural unit and a structural unit having a side chain. Among these, the base material layer preferably contains a hydrogenated block copolymer containing the hard segment X and the soft segment Y configured with a random copolymer of a linear structural unit and a structural unit having a side chain in a main component. Since the linear structural unit contributing to crystallinity and the structural unit having a side chain contributing to elongation property are randomly present in the soft segment Y configuring the hydrogenated block copolymer, it is easier to satisfy both improvement of the elongation property and the breaking strength. That is, the elongation property is not damaged but can be exhibited by steric hindrance of the structural unit having a side chain in the soft segment Y, and on the other hand, due to the presence of the linear structural unit in the soft segment Y, the soft segment, in a case where the elongation is performed, forms a crystal structure between molecules of the soft segment Y, and thereby increasing a cohesive force and increasing the breaking strength.

Particularly, in a case where a product in which a pair of adherends are joined with an adhesive tape interposed therebetween is used to be heated and exposed to a high temperature, the base material layer may be thermally melted and embrittled, and the peeling by elongation may be difficult. In this regard, by using the base material layer having the hydrogenated block copolymer containing the soft segment Y configured with the random copolymer as a main component, even if interlocking between molecules in a part of the hard segment X is released due to heat, the interlocking between molecules is maintained in a part of the linear structural unit in the soft segment Y. Accordingly, the base material layer is not likely to be heated and dissolved and it is possible to suppress embrittlement. Accordingly, not only a general object, but also for a heated object, it is possible to more easily and rapidly remove the adhesive tape from the adherend.

The main component in the base material layer means more than 50% by mass of the component contained in the material for the base material (polymer component) constituting the base material layer.

The block copolymer, which is a precursor of the hydrogenated block copolymer, is preferably a triblock or higher block copolymer and is preferably a triblock copolymer, since it is easy to exhibit the effect of the hard segment X and the effect of the soft segment Y in the hydrogenated block copolymer. In addition, as the block copolymer which is a precursor of the hydrogenated block copolymer having the soft segment, for example, a styrene-based block copolymer, a urethane-based block copolymer, an acrylic-based block copolymer, or the like can be used. The hard segment and soft segment of the styrene-based block copolymer before hydrogenation are the same as those of the polymer blocks (A) and (B) described above. In addition, the hard segment and soft segment of urethane-based block copolymer and acrylic-based block copolymer before hydrogenation can be the same as the hard segment and soft segment of general urethane-based block copolymer and acrylic-based block copolymer.

The soft segment Y in the hydrogenated block copolymer is configured with a random copolymer of the linear structural unit and the structural unit having a side chain by adding hydrogens to the soft segment in the block copolymer which is a precursor. The soft segment Y in the hydrogenated block copolymer may contain a structural unit other than the linear structural unit and the structural unit having a side chain. In the hydrogenated block copolymer, the hydrogenation rate of the soft segment Y is preferably 50 mol % or more, more preferably 75 mol % or more, even more preferably 95 mol % or more.

The hydrogenated block copolymer can exhibit the function described above, as long as it includes the hard segment X and the soft segment Y configured with the random copolymer of the linear structural unit and the structural unit having a side chain, and accordingly, the kind thereof is not particularly limited. For example, a hydrogenated product of a styrene-based block copolymer including the hard segment X and the soft segment Y, a hydrogenated product of a urethane-based block copolymer including the hard segment X and the soft segment Y, a hydrogenated product of an acrylic-based block copolymer including the hard segment X and the soft segment Y, and the like can be used.

Among these, the hydrogenated product of the styrene-based block copolymer configured with at least the polymer block (A) which is the hard segment X and the polymer block (B) which is the soft segment Y configured with the random copolymer of the linear structural unit and the structural unit having a side chain is preferable. That is, the hydrogenated product of the block copolymer configured with at least the polymer block (A) having a styrene-based compound unit as a main component and the polymer block (B) having a conjugated diene unit as a main component is preferable, and the polymer block (B) in the hydrogenated product of the block copolymer is more preferably a block configured with the random copolymer of a linear hydrogenated butadiene structural unit (b1) and a hydrogenated isoprene structural unit having a side chain (b2).

That is, it is preferable that the base material layer contains the hydrogenated product of the block copolymer configured with at least the polymer block (A) and the polymer block (B), the polymer block (A) has a structural unit derived from a styrene-based compound as a main component, and the polymer block (B) is a block configured with the random copolymer of the linear hydrogenated butadiene structural unit (b1) and the hydrogenated isoprene structural unit having a side chain (b2). This is because that the effect of the hydrogenated block copolymer is easily exhibited, since the hydrogenated styrene-based block copolymer having the structure easily forms the base material layer having specific physical properties, and has the polymer block (B) configured with the random copolymer of the linear hydrogenated butadiene structural unit (b1) and the hydrogenated isoprene structural unit having a side chain (b2) as the soft segment Y. The details of the polymer block (A) which is the hard segment X and the polymer block (B) which is the soft segment Y in the hydrogenated product of the styrene-based block copolymer are as described above.

As the hydrogenated product of the block copolymer configured with the polymer block (A) having the styrene-based compound unit as a main component and the polymer block (B) which is the block configured with the random copolymer of the linear hydrogenated butadiene structural unit (b1) and the hydrogenated isoprene structural unit having a side chain (b2), specifically, a styrene-ethylene/butylene-styrene block copolymer (SEBS), a styrene-ethylene-ethylene/propylene-styrene block copolymer (SEEPS), and the like are exemplified.

The styrene-ethylene-ethylene/propylene-styrene block copolymer is a hydrogenated product of a block copolymer formed of styrene-butadiene-isoprene-styrene. Commercially available products can be used as the SEEPS, and examples thereof include Septon 4044, Septon 4055, Septon 4077, and Septon 4099 manufactured by Kuraray Co., Ltd. In addition, the styrene-ethylene/butylene-styrene block copolymer is a hydrogenated product of the styrene-isoprene/butadiene-styrene block copolymer. Commercially available products can be used as the styrene-isoprene/butadiene-styrene block copolymer, and examples thereof include Septon 8004, 8006, and 8007 manufactured by Kuraray Co., Ltd.

Among these, the base material layer preferably contains the styrene-ethylene-ethylene/propylene-styrene block copolymer (SEEPS) or a styrene-(ethylene-butylene)-styrene block copolymer (SEBS) as a main component, and more preferably contains the styrene-ethylene-ethylene/propylene-styrene block copolymer (SEEPS) as a main component. Since the SEEPS has a side chain having a smaller volume than that of the SEBS in the polymer block (B), the interaction of entanglement between molecules is likely to be exhibited. Therefore, the base material layer containing the SEEPS as a main component can further increase the effect of suppressing the decrease in breaking strength due to thermal embrittlement.

The various resins that can be used as the material for the base material can be produced by a well-known method. For example, the styrene-based resin can be produced by a solution polymerization method, an emulsion polymerization method, a solid phase polymerization method, or the like. Among these, the solution polymerization method is preferable, and for example, well-known methods such as an ionic polymerization method such as anionic polymerization and cationic polymerization, a radical polymerization method, and the like can be applied. Among these, the anionic polymerization method is preferable. In the anionic polymerization method, under the presence of a solvent, an anionic polymerization initiator, and if necessary, a Lewis base, an aromatic vinyl compound and a conjugated diene compound is added in sequence to obtain a block copolymer, a coupling agent, if necessary, is added to react, and the block copolymer is hydrogenated, thereby obtaining a styrene-based resin.

Examples of an organolithium compound that can be used as the polymerization initiator in the method include methyllithium, ethyllithium, n-butyllithium, sec-butyllithium, tert-butyllithium, pentyllithium, and the like. Examples of a dilithium compound that can be used as the polymerization initiator include naphthalenedilithium, dilithiohexylbenzene, and the like.

Examples of the coupling agent include dichloromethane, dibromomethane, dichloroethane, dibromoethane, dibromobenzene, phenylbenzoate, and the like.

The amounts of these polymerization initiator and the coupling agent used are appropriately determined by the desired weight average molecular weight of a target styrene-based resin. Generally, the initiator such as the alkyllithium compound or the dilithium compound is preferably used with a proportion of 0.01 to 0.2 parts by mass per 100 parts by mass of a total of a monomer of a styrene-based compound, butadiene, and isoprene used for polymerization, and is preferably used with a proportion of 0.001 to 0.8 parts by mass per 100 parts by mass of the total of the monomer, in a case of using the coupling agent.

The solvent is not particularly limited as long as it does not negatively affect the anionic polymerization reaction, and examples thereof include aliphatic hydrocarbon such as cyclohexane, methylcyclohexane, n-hexane, or n-pentane; aromatic hydrocarbon such as benzene, toluene, and xylene; and the like. In addition, the polymerization reaction is usually performed at a temperature of 0° C. to 100° C., preferably 10° C. to 70° C. for 0.5 to 50 hours, preferably 1 to 30 hours.

By adding the organic Lewis base during the anionic polymerization, the 1,2-bonding amount and the 3,4-bonding amount of the nonhydrogenated block copolymer can be increased, and it is possible to control the 1,2-bonding amount and the 3,4-bonding amount according to the added amount of the organic Lewis base.

Examples of the organic Lewis base that can be used include amine such as triethylamine, N,N,N',N'-tetramethylethylenediamine (TMEDA), or N-methylmorpholine; a nitrogen-containing heterocyclic aromatic compound such as pyridine; amide such as dimethylacetamide or the like; ethers such as dimethyl ether, diethyl ether, tetrahydrofuran (THF), or dioxane; glycol ether such as ethylene glycol dimethyl ether or diethylene glycol dimethyl ether; sulfoxide such as dimethyl sulfoxide or the like; ketone such as acetone or methyl ethyl ketone; and the like. These organic Lewis bases can be used alone or in a combination of two or more thereof.

The amount of the organic Lewis base added is determined by how much the vinyl bonding amount of the isoprene unit and/or the butadiene unit constituting the polymer block (B) is controlled. Therefore, the amount of Lewis base added is not strictly limited, and is usually 0.1 to 1,000 mol and preferably 1 to 100 mol per gram atom of lithium contained in the alkyllithium compound or the dilithium compound used as the polymerization initiator.

After the polymerization is performed by the method, active hydrogen compounds such as alcohols, carboxylic acids and water are added to terminate the polymerization reaction, and a hydrogenation reaction is carried out in the presence of a hydrogenation catalyst in an inert organic solvent. The hydrogenation reaction can be carried out with a hydrogen pressure of 0.1 to 20 MPa, preferably 0.5 to 15 MPa, and more preferably 0.5 to 5 MPa, a reaction temperature of 20° C. to 250° C., preferably 50° C. to 180° C., and more preferably 70° C. to 180° C., and a reaction time of normally 0.1 to 100 hours and preferably 1 to 50 hours.

Examples of the hydrogenated catalyst include Raney nickel; a heterogeneous catalyst in which a metal such as Pt, Pd, Ru, Rh, or Ni is supported on a single substance such as carbon, alumina, or diatomaceous earth; a Ziegler catalyst formed of a combination of a transition metal compound, and an alkylaluminum compound, an alkyllithium compound, and the like; a metallocene-based catalyst; and the like.

The styrene-based resin obtained by doing so can be obtained by solidifying a polymerization reaction solution by pouring it into methanol, and then heating and drying under reduced pressure, or by performing so-called steam stripping by pouring the polymerization reaction solution into hot water with a steam and co-boiling and removing the solvent, and heating and drying under reduced pressure.

Other Components

The other components in the base material layer are not particularly limited and can be appropriately selected as long as the characteristics of the adhesive tape are not impaired, and examples thereof include a tackifier resin; a polymer component other than the materials for the base material; an additive such as a crosslinking agent, an anti-aging agent, a UV absorber, a filler, a polymerization inhibitor, a surface modifier, an antistatic agent, a defoaming agent, a viscosity modifier, a light-resistant stabilizer, a weathering stabilizer, a heat-resistant stabilizer, an antioxidant, a leveling agent, an organic pigment, an inorganic pigment, a pigment dispersant, silica beads, or organic beads; an inorganic filler such as silicon oxide, aluminum oxide, titanium oxide, zirconia, and antimony pentoxide. These may be used alone or in a combination of two or more thereof.

The content of other components in the base material layer can be appropriately selected as long as the characteristics of the adhesive tape are not impaired.

The tackifier resin can be used to increase adhesiveness between the adhesive layer of the adhesive tape and the base material layer or increase heat resistance.

The tackifier resin is not particularly limited and can be appropriately selected according to the purpose, and a tackifier resin having a softening point of 80° C. or higher is preferable, a tackifier resin having a softening point of 90° C. or higher is more preferable, a tackifier resin having a softening point of 100° C. or higher is even more preferable, and a tackifier resin having a softening point of 110° C. or higher is particularly preferable.

As the tackifier resin, for example, those described in a section of "-rubber-based adhesive resin-" which will be described later can be used, and the preferred embodiment is also the same.

The anti-aging agent is not particularly limited and can be appropriately selected from well-known anti-aging agents according to the purpose, and examples thereof include a phenol-based anti-aging agent, a phosphorus-based anti-aging agent (also referred to as a "processing stabilizer"), an amine-based anti-aging agent, an imidazole-based anti-aging agent, and the like. These may be used alone or in a combination of two or more thereof. Among these, the phenol-based anti-aging agent and the phosphorus-based anti-aging agent are preferable, and using these in combination is preferable, because it is possible to effectively improve the heat-resistant stability of the materials for the base material, and as a result, it is possible to obtain an adhesive tape maintaining excellent initial adhesiveness and having more excellent thermal durability. The phosphorus-based anti-aging agent may slightly discolor (turn yellow) over time in a high temperature environment, and accordingly, it is preferable that the amount thereof used is appropriately set in consideration of the balance between initial adhesiveness, thermal durability, and discoloration prevention.

As the phenol-based anti-aging agent, generally, a phenol-based compound having a steric hindrance group can be used, and a monophenol type, a bisphenol type, and a polyphenol type are typical. Specific examples thereof include 2,6-di-t-butyl-4-methylphenol, 2,2'-methylenebis (4-methyl-6-t-butylphenol), 2,2'-methylenebis (4-ethyl-6-t-butylphenol), 4,4'-thiobis (6-t-butyl-3-methylphenol), 4,4'-butylidenebis-(3-methyl-6-t-butylphenol), tetrakis-[methylene-3-(3'5'-di-t-butyl-4-hydroxyphenyl) propionate] methane, n-octadecyl-3-(4'-hydroxy-3'5'-di-t-butylphenyl) propionate, and the like. These may be used alone or in a combination of two or more thereof.

The amount of the phenol-based anti-aging agent used is not particularly limited, can be appropriately selected according to the purpose, and is preferably 0.1 part by mass to 5 parts by mass with respect to 100 parts by mass of the materials for the base material, and in a case where 0.5 parts by mass to 3 parts by mass thereof is used, it is possible to effectively improve the heat-resistant stability of the materials for the base material, and as a result, it is possible to obtain an adhesive tape maintaining excellent initial adhesiveness and having more excellent thermal durability.

<Adhesive Layer>

In the present embodiment, the adhesive tape includes adhesive layers for exhibiting an adhesive strength on both sides of the base material layer. In addition, the adhesive layer of the present invention is formed of an adhesive composition, and contains 1% to 40% by mass of filler particles having an average particle diameter of 0.1 to 40 μm with respect to 100% by mass of the adhesive composition. The adhesive composition in the present invention preferably contains filler particles and an adhesive resin. In addition, the adhesive composition can further contain other components, if necessary, in addition to the filler particles and the adhesive resin.

The stress at 25% elongation of the adhesive layer is not particularly limited, can be appropriately selected according to the purpose, and is preferably 0.04 MPa to 0.4 MPa and more preferably 0.05 MPa to 0.1 MPa. In a case where the stress at 25% elongation of the adhesive layer is within the preferable range, it is possible to obtain an adhesive strength suitable for the adhesive tape and it is possible to comparatively easily peel the adhesive tape off even when it is elongated and peeled off. On the other hand, in a case where the stress at 25% elongation of the adhesive layer is less than 0.04 MPa, the adhesive tape may be peeled off, in a case where a load is generated in a shear direction of the adhesive tape while fixing hard adherends, and in a case where the stress exceeds 0.4 MPa, the force required to elongate the adhesive tape may excessively increase when peeling the adhesive tape off.

The stress at 25% elongation of the adhesive layer indicates a stress value measured, in a case where the adhesive layer is punched into a dumbbell shape with a marked line length of 20 mm and a width of 10 mm, and pulled and elongation by 25% in a length direction at a tensile speed of 300 mm/min by using TENSILON tensile testing machine (model name: RTF-1210, manufactured by A & D Company, Limited) under conditions of a measurement atmosphere of 23° C. and 50% RH.

The breaking strength of the adhesive layer is not particularly limited, can be appropriately selected according to the purpose, and is preferably 0.5 MPa to 2.1 MPa and more preferably 1.0 MPa to 2.1 MPa. In a case where the breaking strength of the adhesive layer is within the preferable range, it is possible to suppress the adhesive tape from being torn even when the adhesive tape is elongated and peeled off, and the load for elongating the adhesive tape does not excessively increase, and therefore the re-peeling operation by peeling is easily performed. On the other hand, in a case where the breaking strength of the adhesive layer is less than 0.5 MPa, an adhesive residue may be generated due to cohesive fracture of the adhesive layer when the adhesive tape is elongated and peeled off, and in a case where the breaking strength thereof exceeds 2.1 MPa, sufficient adhesiveness may not be obtained. The force required to elongate and deform the adhesive tape depends even on a thickness of the adhesive tape. For example, even in a case where the adhesive tape is thick and the adhesive tape having high breaking strength is attempted to elongate to peel it off, the adhesive tape may not be sufficiently elongated and peeled off.

The breaking strength of the adhesive layer in the adhesive tape indicates a stress value measured, in a case where the adhesive layer is punched into a dumbbell shape with a marked line length of 20 mm and a width of 10 mm, and pulled and broken in a length direction at a tensile speed of 300 mm/min by using TENSILON tensile testing machine (model name: RTF-1210, manufactured by A & D Company, Limited) under conditions of a measurement atmosphere of 23° C. and 50% RH.

The breaking elongation of the adhesive layer is not particularly limited, can be appropriately selected according to the purpose, and is preferably 450% to 1,300%, more preferably 500% to 1,200%, and even more preferably 600% to 1,100%. In a case where the breaking elongation of the adhesive layer is within the preferable range, it is possible to achieve both suitable adhesiveness and re-peeling property (easiness of peeling).

The breaking elongation of the adhesive layer in the adhesive tape indicates a tensile elongation rate measured, in a case where the adhesive layer is punched into a dumbbell shape with a marked line length of 20 mm and a width of 10 mm, and pulled and broken in the length direction at the tensile speed of 300 mm/min by using TENSILON tensile testing machine (model name: RTF-1210, manufactured by A & D Company, Limited) under conditions of a measurement atmosphere of 23° C. and 50% RH.

The thickness of the adhesive layer is not particularly limited and can be appropriately selected according to the purpose, and is preferably 5 μm to 150 μm, more preferably 20 pnm to 120 μm, even more preferably 40 μm to 110 μm, particularly preferably 50 μm to 100 μm. The "thickness of the adhesive layer" means the thickness of the adhesive layer on one side of the adhesive tape. In a case where the adhesive tape has adhesive layers on both sides, the average thickness of the adhesive layer on one side and the average thickness of the adhesive layer on the other side may be the same or different, and is preferably the same.

In the present specification, the thickness of the adhesive layer can be measured by the following method. That is, after immersing the adhesive tape in liquid nitrogen for 1 minute, the adhesive tape is bent and split in liquid nitrogen using tweezers with a width direction of the adhesive tape as a fold, and a section for observing a split surface in the thickness direction of the adhesive tape is produced. After returning the section to room temperature in a desiccator, the section is fixed on a sample table so that an electron beam is vertically incident on the split surface, and the split surface is observed using an electron microscope. Based on the scale of the electron microscope, the thickness of the adhesive layer in the adhesive tape is measured at 10 points, and the arithmetic average value thereof is defined as the thickness of the adhesive layer. The thickness of the adhesive layer is a length measured from a surface on one side to a surface on the other side along a stacking direction.

The adhesive layer in the present embodiment is formed of an adhesive composition containing at least an amount of filler particles having an average particle diameter within a predetermined range and an adhesive resin. Hereinafter, each component contained in the adhesive composition constituting the adhesive layer will be described.

Filler Particles

In the present embodiment, the adhesive composition which is a precursor of the adhesive layer contains filler particles having an average particle diameter of 0.1 to 40 µm. Since the adhesive composition, which is a precursor of the adhesive layer, contains the filler particles, the filler particles are exposed from the adhesive layer when the adhesive tape is elongated, and accordingly, a bonding area of the adhesive layer and the adherend decreases. Therefore, even in a case where an elongation direction of the adhesive tape is at a comparatively large angle with respect to an attachment surface of the adherend (hereinafter, also referred to as an "adhesive surface"), for example, a vertical direction (also referred to as a "90° direction"), or even in a case where the adhesive tape is elongated at a high speed, it is possible to more easily and rapidly peel the adhesive tape off.

The kind of the filler particles is not particularly limited, can be appropriately selected as long as the effects of the present invention are not impaired, and may be inorganic filler particles or organic filler particles. These may be used alone or in a combination of two or more thereof.

Specific examples of the inorganic filler particles include aluminum hydroxide, magnesium hydroxide, aluminum oxide, silicon oxide, magnesium oxide, zinc oxide, titanium oxide, zirconium oxide, iron oxide, silicon carbide, boron nitride, aluminum nitride, titanium nitride, silicon nitride, titanium borone, carbon, nickel, copper, aluminum, titanium, gold, silver, zirconium hydroxide, basic magnesium carbonate, dolomite, hydrotalcite, calcium hydroxide, barium hydroxide, tin oxide, tin oxide hydrate, borax, zinc borate, zinc metaborate, barium metaborate, zinc carbonate, magnesium carbonate-calcium, calcium carbonate, barium carbonate, molybdenum oxide, antimony oxide, red phosphorus, mica, clay, kaolin, talc, zeolite, wollastonite, smectite, silica (quartz, fumed silica, precipitated silica, silicic acid anhydride, fused silica, crystalline silica, ultrafine powder atypical silica, and the like), potassium titanate, magnesium sulfate, sepiolite, zonolite, aluminum borate, barium sulfate, barium titanate, zirconia oxide, cerium, tin, indium, carbon, sulfur, terium, cobalt, molybdenum, strontium, chromium, barium, lead, tin oxide, indium oxide, diamond, magnesium, platinum, zinc, manganese, stainless steel, and the like. Among these, aluminum hydroxide, nickel, and the like are preferable.

In addition, the inorganic filler may be subjected to a surface treatment such as a silane coupling treatment or a stearic acid treatment in order to improve dispersibility in the adhesive resin.

Specific examples of the organic filler particles include a polystyrene-based filler, a benzoguanamine-based filler, a polyethylene-based filler, a polypropylene-based filler, a silicone-based filler, a urea-formalin-based filler, a styrene/methacrylic acid copolymer, a fluorine-based filler, an acrylic-based filler, a polycarbonate-based filler, a polyurethane-based filler, a polyamide-based filler, an epoxy resin-based filler, a thermosetting resin-based hollow filler, and the like.

Among the organic filler particles, as the silicone-based filler, specifically, silicone rubber particles obtained by three-dimensionally crosslinking linear organopolysiloxane (see JP-A-63-77942, JP-A-3-93834, and JP-A-04-198324), particles obtained as powder of silicone rubber (see U.S. Pat. No. 3,843,601, JP-A-62-270660, and JP-A-59-96,122), and the like can be used. In addition, silicone composite particles (see JP-A-7-196815) having a structure in which a surface of silicone rubber particles obtained by the method is covered with a silicone resin which is a polyorganosylsesquioxane cured product having a structure crosslinked into a three-dimensional network shape represented by $(R'SiO_{3/2})_n$ ($R'$ represents a substituted or unsubstituted monovalent hydrocarbon group) can also be used.

As such silicone particles, commercially available products such as trade names of Trefil E-500, Trefil E-600, Trefil E-601, Trefil E-850, and the like from Dow Corning Toray Silicone Co., Ltd. and KMP-600, KMP-601, KMP-602, KMP-605, and the like from Shin-Etsu Chemical Co., Ltd. can be used.

In addition, as other silicone-based fillers, acrylic-modified silicone particles can be used. As the acrylic-modified silicone particles, an emulsified graft polymer of polyorganosiloxane represented by General Formula (1), an acrylic acid ester monomer and/or a methacrylic acid ester monomer, and a functional group-containing monomer copolymerizable therewith is used.

[Chem. 1]

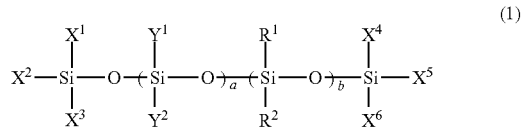

(In the above General Formula (1), $R^1$ and $R^2$ each independently represent substituted or unsubstituted alkyl group having 1 to 20 carbon atoms or allyl group having 6 to 20 carbon atoms, $X^1$, $X^2$, $X^3$, $X^4$, $X^5$, and $X^6$ each independently represent substituted or unsubstituted alkyl group having 1 to 20 carbon atoms, allyl group having 6 to 20 carbon atoms, and alkoxy group or hydroxyl group having 1 to 20 carbon atoms, $Y^1$ and $Y^2$ each independently represent a group represented by $X^1$ or $—[O—Si(X^7)(X^8)]_c—X^9$, and $X^7$, $X^8$, and $X^9$ each independently represent substituted or unsubstituted alkyl group having 1 to 20 carbon atoms, allyl group having 6 to 20 carbon atoms, alkoxy group or hydroxyl group having 1 to 20 carbon atoms, at least two groups of $X^1$, $X^2$, $X^3$, $X^4$, $X^5$, $X^6$, $X^7$, $X^8$, $X^9$, $Y^1$, and $Y^2$ are hydroxyl groups, and a, b and c each are independently a positive number of 0≤a≤1,000, a positive number of 100≤b≤10,000, and a positive number that satisfies 1≤c≤1,000.)

In the General Formula (1), the alkyl group having 1 to 20 carbon atoms represented by $R^1$ or $R^2$ may be linear, branched, or cyclic. Specifically, a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group, a cyclopentyl group, a cyclohexyl group, and a cycloheptyl group are used. These alkyl groups may be substituted with a halogen atom, an acryloxy group, a methacryloxy group, a carboxy group, an alkoxy group, an alkenyloxy group, an amino group, an alkyl, alkoxy, or a (meth)acryloxy substituted amino group.

Examples of the allyl group having 6 to 20 carbon atoms represented by $R^1$ or $R^2$ include a phenyl group, a tolyl group, and a naphthyl group.

$R^1$ or $R^2$ is preferably a methyl group.

In the General Formula (1), as the alkyl group having 1 to 20 carbon atoms and the allyl group having 6 to 20 carbon atoms represented by $X^1$ to $X^9$, the same groups as each of the alkyl group and the allyl group exemplified by $R^1$ or $R^2$ are used.

Examples of the alkoxy group having 1 to 20 carbon atoms represented by $X^1$ to $X^9$ include a methoxy group, an ethoxy group, a propoxy group, a butoxy group, a hexyloxy group, a heptyloxy group, an octyloxy group, a decyloxy group, and a tetradecyloxy group.

In the General Formula (1), a, b and c are respectively the positive number of 0≤a≤1,000, the positive number of 100≤b≤10,000, and the positive number of 1≤c≤1,000, and a is preferably a positive number from 0 to 200. In a case where a becomes larger than 1,000, a strength of a film to be obtained becomes insufficient. b is preferably a positive number of 1,000 to 5,000. In a case where b is less than 100, the flexibility of the film becomes poor, and in a case where b is larger than 10,000, it becomes difficult to become a solid like particles. c is preferably a positive number from 1 to 200.

In addition, the polyorganosiloxane represented by General Formula (1) has at least two, preferably 2 to 4 hydroxyl groups in one molecule from a viewpoint of crosslinkability, and the hydroxyl groups are preferably located at both terminals of the molecular chain.

Examples of the acrylic acid ester monomer or methacrylic acid ester monomer include methyl acrylate, ethyl acrylate, isopropyl acrylate, n-butyl acrylate, methyl methacrylate, ethyl methacrylate, isopropyl methacrylate, cyclohexyl methacrylate and the like.

Examples of the functional group-containing monomer copolymerizable with the acrylic acid ester monomer and/or the methacrylic acid ester monomer include monomers having an unsaturated bond containing a carboxyl group, an amide group, a hydroxyl group, a vinyl group, an allyl group, and the like.

It is preferable that the acrylic-modified silicone powder is obtained by mixing 10 to 100 parts by mass of the acrylic acid ester monomer and/or the methacrylic acid ester monomer and 0.01 to 20 parts by mass of the functional group-containing monomer copolymerizable therewith with respect to 100 parts by mass of the polyorganosiloxane represented by General Formula (1), and performing emulsion graft polymerization. The conditions in the emulsion graft polymerization are not particularly limited, and as an initiator used in the polymerization, a well-known radical initiator usually used for an acrylic-based polymer can be used. In addition, as an emulsifier, a well-known anionic surfactant or nonionic surfactant can be used.

The acrylic-modified silicone particles are granulated and powdered by the methods exemplified below. That is, spray-dry drying, air-flow drying, and the like are exemplified, but a spray dryer is preferable in consideration of productivity. The powdering is preferably hot-dried, and preferably treated at 80° C. to 150° C.

As the acrylic-modified silicone particles, for example, commercially available products such as Charine R-170S and Charine R-200 (all manufactured by Nissin Chemical Industry Co., Ltd.) can be used.

The shape of the filler particles is not particularly limited and can be appropriately selected according to the purpose, and may be a regular shape or an irregular shape. Specific examples of the shape of the filler particles include a polygonal shape, a cube shape, an elliptical shape, a spherical shape, a needle shape, a flat plate shape, and a scale shape. The filler particles having these shapes may be used alone or in a combination of two or more thereof. In addition, the filler particles having these shapes may be aggregated. Among these, the shape of the filler particles is preferably the elliptical shape, the spherical shape, and the polygonal shape. In a case where the shape of the filler particles is the elliptical shape, the spherical shape, and the polygonal shape, or the like, the adhesive layer slides smoothly on the adherend when the adhesive tape is elongated, and it is possible to more easily and rapidly peel the adhesive tape off.

The particle size distribution (D90/D10) of the filler particles is not particularly limited, can be appropriately selected according to the purpose, and is preferably 2.5 to 20, from a viewpoint of impact resistance, more preferably 2.5 to 15, and even more preferably 2.5 to 5. In a case where the particle size distribution (D90/D10) of the filler particles is within the preferable range, it is possible to more easily and rapidly peel the adhesive tape off, and even in a case where the thickness of the base material of the adhesive tape is thin, the adhesive tape is not likely to be torn, and excellent impact resistance, shear adhesive strength, and split adhesive strength are obtained. On the other hand, in a case where the particle size distribution (D90/D10) of the filler particles is less than 2.5, the elongation peeling property may be impaired, and in a case where the particle size distribution thereof exceeds 20, the adhesive performance such as impact resistance, shear adhesive strength, split adhesive strength, and the like may be impaired.

The particle size distribution (D90/010) of the filler particles can be obtained by measuring the average particle diameter of the filler particles by using, for example, a measuring machine (microtrack) using a laser diffraction scattering method and converting it into a particle size distribution.

The average particle diameter of the filler particles is 0.1 to 40 μm, preferably 5 to 40 μm, more preferably 10 to 35 μm, even more preferably 10 to 30 μm, and particularly preferably 10 to 25 μm. In a case where the average particle diameter of the filler particles is within the preferable range, it is possible to more easily and rapidly peel the adhesive tape off, and even in a case where the thickness of the base material of the adhesive tape is thin, the adhesive tape is not likely to be torn, and excellent impact resistance, shear adhesive strength, and split adhesive strength are obtained. On the other hand, in a case where the particle diameter of the filler particles is less than 0.1 μm, the elongation peeling property may be impaired, and in a case where the particle diameter thereof exceeds 40 μm, the adhesive performance such as impact resistance, shear adhesive strength, split adhesive strength, and the like may be impaired.

The average particle diameter of the filler particles refers to a volume average particle diameter, and can be measured by using, for example, a measuring machine (microtrack) using a laser diffraction scattering method.

In a case where the silicone rubber particles or the silicone composite particles are used as the filler particles, the average particle diameter of the silicone rubber particles or the silicone composite particles is preferably 0.1 to 40 μm and more preferably 5 to 40 μm. In a case where the average particle diameter is less than 0.1 μm, the effect of decreasing the adhesive area by the filler particles when the adhesive tape is elongated tends to decrease, and in a case where the average particle diameter is larger than 40 μm, the adhesive strength of the adhesive tape tends to decrease.

In a case of using the acrylic-modified silicone particles as the filler particles, the average particle diameter of the acrylic-modified silicone particles is preferably 0.1 to 40 μm, more preferably 5 to 40 μm, even more preferably 5 to 30 μm, and still more preferably 10 to 25 μm. In a case where the average particle diameter is less than 0.1 μm, the effect of decreasing the adhesive area by the filler particles when the adhesive tape is elongated tends to decrease, and in a case where the average particle diameter is larger than 40 μm, the adhesive strength of the adhesive tape tends to decrease.

The ratio of the average particle diameter of the filler particles to the average thickness of the adhesive layer is not particularly limited, can be appropriately selected according to the purpose, and the ratio of the average particle diameter of the filler particles to the average thickness of the adhesive layer represented by [volume average particle diameter of filler particles/average thickness of adhesive layer] is preferably 5/100 or more, more preferably 5/100 to 95/100, even more preferably 10/100 to 75/100, and particularly preferably 20/100 to 60/100. In a case where the ratio is 5/100 or more, it is possible to more easily and rapidly peel adhesive tape off, and even in a case where the thickness of the base material of the adhesive tape is thin, it is difficult to be torn. In addition, in a case where the ratio is 95/100 or less, it is advantageous that more excellent adhesive performance such as impact resistance, shear adhesive strength, split adhesive strength, and the like are obtained.

The content of the filler particles in the adhesive layer is 1% to 40% by mass with respect to 100% by mass of the adhesive composition, and is preferably 3.5% to 40% by mass, preferably 5% to 37% by mass, and more preferably 15% to 35% by mass. In a case where the content of the filler particles with respect to 100% by mass of the adhesive composition is 1% by mass or more, it is possible to more easily and rapidly peel the adhesive tape off. In addition, in a case where the content of the filler particles with respect to 100% by mass of the adhesive composition is 40% by mass or less, it is possible to prevent the adhesive composition from remaining on the adherend, the impact resistance from being deteriorated, and the shear adhesive strength or the split adhesive strength from being weakened.

The content of the filler particles in the adhesive layer can be appropriately prepared when preparing the adhesive composition.

In a case where the silicone rubber particles or the silicone composite particles are used as the filler particles, the content of the silicone rubber particles or the silicone composite particles is preferably 15% to 35% by mass with respect to 100% by mass of the adhesive composition.

In a case where the acrylic-modified silicone particles are used as the filler particles, the content of the acrylic-modified silicone particles is preferably 1.0% to 20% by mass with respect to 100% by mass of the adhesive composition.

The volume ratio of the filler particles to the volume of the entire adhesive layer is preferably 4% to 40%, more preferably 5% to 30%, even more preferably 5% to 20%, and most preferably 5% to 15%. In a case where the volume ratio of the filler particles is 4% or more, it is possible to more easily and rapidly peel the adhesive tape off. In addition, in a case where the volume ratio of the filler particles is 40% or less, it is possible to prevent the adhesive composition from remaining on the adherend, the impact resistance from being deteriorated, and the shear adhesive strength or the split adhesive strength from being weakened.

The volume ratio of the filler particles to the adhesive layer can be calculated from Equations (1) to (3).

$$\text{Mass } A \text{ of adhesive resin}^{*1}(g)/\text{Density } A \text{ of adhesive resin}^{*1}(g/cm^3) = \text{Volume } A \text{ of adhesive resin}^* = (cm^3) \quad \text{Equation (1)}$$

$$\text{Mass } B \text{ of filler particles}(g)/\text{Density } B \text{ of filler particles}(g/cm^3) = \text{Volume } B \text{ of filler particles}(cm^3) \quad \text{Equation (2)}$$

$$\text{Volume } B \text{ of filler particles}(cm^3)/(\text{volume} A \text{ of adhesive resin}^{*1}(cm^3) + \text{volume} B \text{ of filler particles}(cm^3)) \times 100 = \text{volume ratio of filler particles (\%)} \quad \text{Equation (3)}$$

The adhesive resin represented by *1 in Equations (1) and (3) may contain other components which will be described later.

The density is a value measured according to JIS Z 8804.

Adhesive Resin

The adhesive resin is not particularly limited and can be appropriately selected from well-known materials, and examples thereof include an acrylic-based adhesive resin, a rubber-based adhesive resin, a urethane-based adhesive resin, a silicone-based adhesive resin, and the like. These may be used alone or in a combination of two or more thereof. Among these, as the adhesive resin, the acrylic-based adhesive resin is preferable.

Acrylic-Based Adhesive Resin

The acrylic-based adhesive resin is not particularly limited and can be appropriately selected according to the purpose, and for example, a resin containing an acrylic polymer and, if necessary, an additive such as a tackifier resin or a crosslinking agent, and the like is used.

The acrylic polymer can be produced, for example, by polymerizing a (meth)acrylate monomer.

As the (meth)acrylate monomer, for example, an alkyl (meth)acrylate having an alkyl group having 1 to 12 carbon atoms can be used.

Specific examples of the alkyl (meth)acrylate having an alkyl group having 1 to 12 carbon atoms include methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, 2-ethylhexyl (meth)acrylate, and the like. These may be used alone or in a combination of two or more thereof.

As the alkyl (meth)acrylate having an alkyl group having 1 to 12 carbon atoms, it is preferable to use an alkyl (meth)acrylate having an alkyl group having 4 to 12 carbon atoms, it is more preferable to use alkyl (meth)acrylate having an alkyl group having 4 to 8 carbon atoms, and it is particularly preferable to use n-butyl acrylate, in order to ensure excellent adhesiveness to the adherend.

The used amount of alkyl (meth)acrylate having an alkyl group having 1 to 12 carbon atoms is preferably 80% to 98.5% by mass and more preferably 90% to 98.5% by mass with respect to the total amount of the monomer used for producing the acrylic polymer.

As the monomer that can be used for producing the acrylic polymer, a highly polar vinyl monomer can be used, if necessary, in addition to the components described above.

Examples of the highly polar vinyl monomer include a (meth)acrylic monomer such as a (meth)acrylic monomer having a hydroxyl group, a (meth)acrylic monomer having a carboxyl group, and a (meth)acrylic monomer having an amide group, vinyl acetate, ethylene oxide-modified succinic acid acrylate, and a sulfonic acid group-containing monomer such as 2-acrylamide-2-methylpropansulfonate. These may be used alone or in a combination of two or more thereof.

Specific examples of the vinyl monomer having a hydroxyl group include (meth)acrylic monomers such as 2-hydroxyethyl (meth) acrylate, 2-hydroxypropyl (meth) acrylate, 4-hydroxybutyl (meth)acrylate, 6-hydroxyhexyl (meth)acrylate, and the like.

The vinyl monomer having a hydroxyl group is preferably used in a case of using an adhesive resin containing an isocyanate-based crosslinking agent. Specifically, as the vinyl monomer having a hydroxyl group, 2-hydroxyethyl (meth)acrylate, 4-hydroxybutyl (meth)acrylate, and 6-hydroxyhexyl (meth)acrylate are preferably used.

The used amount of the vinyl monomer having a hydroxyl group is preferably 0.01% to 1.0% by mass and more preferably 0.03% to 0.3% by mass with respect to the total amount of the monomer used for producing the acrylic polymer.

Specific examples of the vinyl monomer having a carboxyl group include (meth)acrylic monomers such as acrylate, methacrylate, itaconic acid, maleic acid, (meth)acrylic acid dimer, crotonic acid, ethylene oxide-modified succinic acid acrylate, and the like. Among these, acrylic acid is preferable.

Specific examples of the vinyl monomer having an amide group include (meth)acrylic monomers such as N-vinylpyrrolidone, N-vinylcaprolactam, acryloylmorpholine, acrylamide, N,N-dimethylacrylamide, and the like.

The used amount of the highly polar vinyl monomer is preferably 1.5% by mass to 20% by mass and more preferably 1.5% by mass to 10% by mass with respect to the total amount of the monomer used for producing the acrylic polymer, and the used amount thereof is even more preferably 2% by mass to 8% by mass because it is possible to form an adhesive layer having a good balance in terms of cohesive force, holding power and adhesiveness.

A method for producing the acrylic polymer is not particularly limited, and can be appropriately selected from well-known methods according to the purpose, and examples thereof include methods for polymerizing the monomer by a polymerization method such as a solution polymerization method, a bulk polymerization method, a suspension polymerization method, and an emulsion polymerization method. Among these, the acrylic polymer is preferably produced by the solution polymerization method or the bulk polymerization method.

In the case of polymerization, if necessary, a peroxide-based thermal polymerization initiator such as benzoyl peroxide or lauroyl peroxide, an azo thermal polymerization initiator such as azobisisobutylnitrile or the like, an acetophenone-based photopolymerization initiator, a benzoin ether-based photopolymerization initiator, a benzyl ketal-based photopolymerization initiator, an acylphosphine oxide-based photopolymerization initiator, a benzoin-based photopolymerization initiator, a benzophenone-based photopolymerization initiator, and the like can be used.

As the weight average molecular weight of the acrylic polymer obtained by the method, a weight average molecular weight measured in terms of standard polystyrene using a gel permeation chromatograph (GPC) is preferably 300,000 to 3,000,000 and more preferably 500,000 to 2,500,000.

Here, the measurement of the weight average molecular weight of the acrylic polymer by the GPC method is a standard polystyrene conversion value measured by using a GPC apparatus (HLC-8329GPC, manufactured by Tosoh Corporation), and the measurement conditions are as follows.

[Measurement Conditions]
Sample concentration: 0.5% by mass (tetrahydrofuran (THF) solution)
Sample injection amount: 100 µL
Eluent: THF
Flow rate: 1.0 mL/min
Measurement temperature: 40° C.
Main column: two TSKgel GMHHR-H (20)
Guard column: TSKgel HXL-H
Detector: Differential refractometer
Standard polystyrene molecular weight: 10,000 to 20,000,000 (manufactured by Tosoh Corporation)

As the acrylic-based adhesive resin, it is preferable to use a resin containing a tackifier resin in order to improve the adhesiveness to the adherend and the surface adhesive strength.

The tackifier resin contained in the acrylic-based adhesive resin is not particularly limited and can be appropriately selected according to the purpose, and a tackifier resin having a softening point of 30° C. to 180° C. is preferable, and a tackifier resin having a softening point of 70° C. to 140° C. is more preferable for forming the adhesive layer having high adhesive performance. In a case of using the (meth)acrylate-based tackifier resin, the glass transition temperature thereof is preferably 30° C. to 200° C. and more preferably 50° C. to 160° C.

Specific examples of the tackifier resin contained in the acrylic-based adhesive resin include a rosin-based tackifier resin, a polymerized rosin-based tackifier resin, a polymerized rosin ester-based tackifier resin, a rosinphenol-based tackifier resin, a stabilized rosin ester-based tackifier resin, a disproportionation rosin ester-based tackifier resin, a hydrogenated rosin ester-based tackifier resin, a terpene-based tackifier resin, a terpene phenol-based tackifier resin, a petroleum resin-based tackifier resin, a (meth)acrylate-based tackifier resin, and the like. These may be used alone or in a combination of two or more thereof. Among these, the tackifier resin is preferably the polymerized rosin ester-based tackifier resin, the rosinphenol-based tackifier resin, the disproportionation rosin ester-based tackifier resin, the hydrogenated rosin ester-based tackifier resin, the terpenphenol-based resin, and the (meth)acrylate-based resin.

The amount of the tackifier resin used is not particularly limited, can be appropriately selected according to the purpose, and is preferably 5 parts by mass to 65 parts by mass with respect to 100 parts by mass of the acrylic polymer, and more preferably 8 parts by mass to 55 parts by mass, because it is easy to ensure the adhesiveness to the adherend.

As the acrylic-based adhesive resin, it is preferable to use a resin containing a crosslinking agent in order to further improve the cohesive force of the adhesive layer.

The crosslinking agent is not particularly limited and can be appropriately selected according to the purpose, and examples thereof include an isocyanate-based crosslinking agent, an epoxy-based crosslinking agent, a metal chelate-based crosslinking agent, an aziridine-based crosslinking agent, and the like. These may be used alone or in a combination of two or more thereof. Among these, as the crosslinking agent, a type of crosslinking agent which is mixed after producing the acrylic polymer to promote a crosslinking reaction is preferable, and an isocyanate-based crosslinking agent and an epoxy-based crosslinking agent having high reactivity with the acrylic polymer is more preferably used.

Examples of the isocyanate-based crosslinking agent include tolylene diisocyanate, triphenylmethane isocyanate, naphthylene-1,5-diisocyanate, hexamethylene diisocyanate, diphenylmethane diisocyanate, xylylene diisocyanate, trimethylol propan-modified tolylene diisocyanate, and the like. These may be used alone or in a combination of two or more thereof. Among these, tolylene diisocyanate, which is a trifunctional polyisocyanate compound, trimethylol propan adduct thereof, and triphenylmethane isocyanate are particularly preferable.

As an index of a degree of crosslinking, a value of a gel fraction for measuring an insoluble content after immersing the adhesive layer in toluene for 24 hours is used. The gel fraction of the adhesive layer is not particularly limited, can be appropriately selected according to the purpose, and is preferably 10% by mass to 70% by mass, more preferably 25% by mass to 65% by mass, and even more preferably 35% by mass to 60% by mass for obtaining an adhesive layer having excellent cohesiveness and adhesiveness.

The gel fraction refers to a value measured by the following method. An adhesive composition is applied onto a peeling sheet so that a thickness after drying becomes 50 μm, dried at 100° C. for 3 minutes, aged at 40° C. for 2 days, and cut into 50 mm square, and this is used as a sample. Next, a mass (G1) of the sample before immersion in toluene is measured in advance, a toluene-insoluble content of the sample after being immersed in the toluene solution at 23° C. for 24 hours is separated by filtering with a 300 mesh wire net, a mass (G2) of a residue after drying at 110° C. for 1 hour is measured, and the gel fraction is obtained according to Equation (4). A mass (G3) of the filler particles in the sample is calculated from the mass (G1) of the sample and the composition of the adhesive composition.

Gel fraction (% by mass)=(G2−G3)/(G1−G3)×100   Equation (4)

Rubber-Based Adhesive Resin

The rubber-based adhesive resin is not particularly limited, and a resin containing a rubber material that can be generally used as an adhesive resin such as a synthetic rubber-based adhesive resin or a natural rubber-based adhesive resin, and, if necessary, an additive such as the tackifier resin is used.

Examples of the rubber material include a block copolymer of an aromatic vinyl compound and a conjugated diene compound, specifically, a styrene-based resin such as a styrene-isoprene copolymer, a styrene-isoprene-styrene copolymer, a styrene-isoprene-butadiene-styrene copolymer, a styrene-butadiene-styrene copolymer, a styrene-ethylene-butylene copolymer, a styrene-ethylene-propylene copolymer, and a hydrogenated product thereof. These may be used alone or in a combination of two or more thereof. Among these, it is more preferable to use two or more kinds of styrene-based resins in combination because they can give excellent adhesive properties and holding power to the adhesive tape, and it is particularly preferable to use both the styrene-isoprene copolymer and the styrene-isoprene-styrene copolymer in combination.

As the styrene-based resin, for example, a styrene-based resin having a single structure of a linear structure, a branched structure, or a multi-branched structure may be used, or a mixture of different structures may be used. In a case where a styrene-based resin having abundant linear structure is used for the adhesive layer, excellent adhesive performance can be imparted to the adhesive tape. On the other hand, the styrene-based resin having a branched structure or a multi-branched structure in which a styrene block is arranged at a molecular terminal can have a pseudo-crosslinked structure and can impart excellent cohesive force, and accordingly, it is possible to impart high holding power. Therefore, it is preferable to mix and use the styrene-based resin according to the required characteristics.

As the styrene-based resin, the structural unit represented by Chemical Formula (2) with respect to the total mass of the styrene-based resin is preferably 10% by mass to 80% by mass, more preferably 12% by mass to 60% by mass, even more preferably 15% by mass to 40% by mass, and particularly preferably 17% by mass to 35% by mass. Thereby, excellent adhesiveness and heat resistance can be obtained. * in Chemical Formula (2) is an atomic bonding representing a bond with another atom.

[Chem. 2]

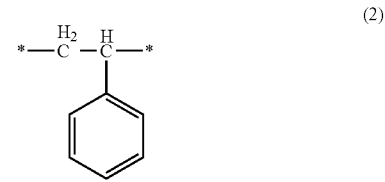

(2)

In a case where the styrene-isoprene copolymer and the styrene-isoprene-styrene copolymer are used in combination as the styrene-based resin, the content of the styrene-isoprene copolymer with respect to the total mass of the styrene-isoprene copolymer and the styrene-isoprene-styrene copolymer is preferably 0% by mass to 80% by mass, more preferably 0% by mass to 77% by mass, even more preferably 0% by mass to 75% by mass, and particularly preferably 0% by mass to 70% by mass. In a case where the content of the styrene-isoprene copolymer is within the preferable range, it is possible to achieve both excellent adhesive performance and thermal durability for the adhesive tape.

In addition, as the styrene-isoprene copolymer, it is preferable to use a styrene-isoprene copolymer having the weight average molecular weight measured in terms of standard polystyrene using the gel permeation chromatograph (GPC) of 10,000 to 800,000, it is more preferable to use a styrene-isoprene copolymer having the weight average molecular weight of 30,000 to 500,000, and it is even more preferable to use the styrene-isoprene copolymer having the weight average molecular weight of 50,000 to 300,000. In a case where the weight average molecular weight of the styrene-isoprene copolymer is within the preferable range, heat fluidity and compatibility during solvent dilution can be ensured, so that the workability in the production step is excellent and it is possible to obtain an adhesive tape having thermal durability.

Here, the measurement of the weight average molecular weight of the styrene-isoprene copolymer by the GPC method is a standard polystyrene conversion value measured by using a GPC apparatus (SC-8020, manufactured by Tosoh Corporation), and the measurement conditions are as follows.

Measurement Conditions

Sample concentration: 0.5% by mass (tetrahydrofuran solution)
Sample injection amount: 100 μL
Eluent: Tetrahydrofuran
Flow rate: 1.0 mL/min
Measurement temperature: 40° C.
Main column: two TSKgel (registered trademark) GMHHR-H (20)
Guard column: TSKgel HXL-H
Detector: Differential refractometer
Standard polystyrene molecular weight: 10,000 to 20,000,000 (manufactured by Tosoh Corporation)

The method for producing the styrene-based resin is not particularly limited and can be appropriately selected from well-known production methods of the related art. A block copolymer is obtained by the anion living polymerization method, a coupling agent is added if necessary, a reaction is allowed, and thereby obtaining a styrene-based resin.

Specifically, the method for producing the styrene-isoprene copolymer is not particularly limited and can be appropriately selected from well-known production methods of the related art, and for example, a method for sequentially polymerizing a styrene block and an isoprene block by the anion living polymerization method is used.

The method for producing the styrene-isoprene-styrene copolymer is not particularly limited and can be appropriately selected from well-known production methods of the related art, and examples thereof include a method for sequentially polymerizing a styrene block and an isoprene block by the anion living polymerization method, a method for producing a block copolymer having a living active terminal, allowing a reaction with a coupling agent to produce a coupled block copolymer.

The method for producing a mixture of the styrene-isoprene copolymer and the styrene-isoprene-styrene copolymer is not particularly limited and can be appropriately selected from well-known production methods of the related art, and for example, a method for mixing the styrene-isoprene copolymer and the styrene-isoprene-styrene copolymer produced in the method is used.

In addition, as a method for producing the mixture of the styrene-isoprene copolymer and the styrene-isoprene-styrene copolymer, it is also possible to produce the mixture as a mixture at the same time in one polymerization step.

As a more specific embodiment, by the anion living polymerization method, first, a styrene monomer is polymerized in a polymerization solvent using an anionic polymerization initiator to form a polystyrene block having a living active terminal. Second, isoprene is polymerized from the living active terminal of the polystyrene block to obtain a styrene-isoprene diblock copolymer having a living active terminal. Third, a part of the styrene-isoprene diblock copolymer having a living active terminal is reacted with the coupling agent to form a coupled styrene-isoprene-styrene block copolymer. Fourth, the residue of the styrene-isoprene diblock copolymer having a living active terminal is deactivated by using a polymerization inhibitor to deactivate the living active terminal to form a styrene-isoprene diblock copolymer.

The tackifier resin contained in the rubber-based adhesive resin is not particularly limited and can be appropriately selected according to the purpose, and it is preferable to use a tackifier resin having a softening point of 80° C. or higher. Therefore, it is possible to obtain an adhesive tape having excellent initial adhesiveness and thermal durability.

The tackifier resin is preferably solid at room temperature (23° C.), and specific examples thereof include a petroleum resin such as a C5 series petroleum resin, a C9 series petroleum resin, a C5 series/C9 series petroleum resin, or an alicyclic-based petroleum resin, a polymerized rosin-based resin, a terpene-based resin, a rosin-based resin, a terpene-phenol resin, a styrene resin, a coumarone indene resin, a zylene resin, and a phenolic resin. These may be used alone or in a combination of two or more thereof. Among these, it is preferable to use the C5 series petroleum resin and the polymerized rosin-based resin in combination as the tackifier resin in order to achieve both excellent initial adhesiveness and thermal durability.

The petroleum resin is easily compatible with the structural unit represented by Chemical Formula (1) constituting the styrene-based resin, and as a result, it is possible to further improve the initial adhesive strength and thermal durability of the adhesive tape.

Examples of the C5 series petroleum resin include Escorez 1202, Escorez 1304, Escorez 1401 (all manufactured by Exxon Mobil Corporation), Wingtack 95 (manufactured by The Goodyear Tire & Rubber Company), Quinton K100, Quinton R100, Quinton F100 (all manufactured by Zeon Corporation), Picotack 95, and PicoPale 100 (manufactured by Rika Hercules Co., Ltd.).

Examples of the C9 series petroleum resin include Nisseki Neopolymer L-90, Nisseki Neopolymer 120, Nisseki Neopolymer 130, Nisseki Neopolymer 140, Nisseki Neopolymer 150, Nisseki Neopolymer 170S, Nisseki Neopolymer 160, Nisseki Neopolymer E-100, Nisseki Neopolymer E-130, Nisseki Neopolymer 130S, and Nisseki Neopolymer S (all manufactured by ENEOS Corporation), Petcol (registered trademark) (Manufactured by Tosoh Corporation), and the like.

As the C5 series/C9 series petroleum resin, a copolymer of C5 series petroleum resin and C9 series petroleum resin can be used, and for example, Escorez 2101 (manufactured by Exxon Mobil Corporation), Quinton G115 (manufactured by Zeon Corporation), Hercotac 1149 (manufactured by Rika Hercules Co., Ltd.), and the like can be used.

The alicyclic-based petroleum resin can be obtained by hydrogenating C9 series petroleum resin, and examples thereof include Escorez 5300 (manufactured by Exxon Mobil Corporation), Archon P-100 (manufactured by Arakawa Chemical Industries, Ltd.), Rigalite R101. (Manufactured by Rika Hercules Co., Ltd.), and the like.

The amount of the tackifier resin used is not particularly limited, can be appropriately selected according to the purpose, and is 0% by mass to 100% by mass, more preferably 0% by mass to 70% by mass, even more preferably 0% by mass to 50% by mass, and particularly preferably 0% by mass to 30% by mass, with respect to the total amount of the components constituting the rubber-based adhesive resin. By using the tackifier resin within the preferable range, it is easy to achieve both excellent breaking elongation and thermal durability of the adhesive tape while increasing interfacial adhesiveness between the adhesive layer and the base material layer.

The used amount of the tackifier resin having a softening point of 80° C. or higher is not particularly limited, can be appropriately selected according to the purpose, and is preferably 3% by mass to 100% by mass, more preferably 5% by mass to 80% by mass, and particularly preferably 5% by mass to 80% by mass with respect to the total amount of the styrene-based resin, when obtaining an adhesive tape achieving both more excellent adhesiveness and excellent thermal durability.

In addition, in order to obtain adhesiveness and initial adhesiveness in a constant temperature environment, a tackifier resin having a softening point of −5° C. or lower can also be used in combination with a tackifier resin having a softening point of 80° C. or higher.

The tackifier resin having a softening point of −5° C. or lower is not particularly limited and can be appropriately selected from well-known tackifier resins according to the purpose, and it is preferable to use a liquid tackifier resin at room temperature.

Specific examples of the tackifier resin having a softening point of −5° C. or lower include liquid rubber such as process oil, polyester, polybutene, and the like. These may be used alone or in a combination of two or more thereof. Among these, it is preferable to use polybutene for the tackifier resin having a softening point of −5° C. or lower in order to exhibit further excellent initial adhesiveness.

The used amount of the tackifier resin having a softening point of −5° C. or lower is preferably 0% by mass to 40% by mass and more preferably 0% by mass to 30% by mass with respect to the total amount of the tackifier resin.

The used amount of the tackifier resin having a softening point of −5° C. or lower is preferably 0% by mass to 40% by mass with respect to the total amount of the styrene-based resin, and more preferably 0% by mass to 30% by mass, because it is possible to perform excellent adhesion by improving the initial adhesive strength, and obtain sufficient thermal durability.

The mass ratio of the tackifier resin having a softening point of 80° C. or higher to the tackifier resin having a softening point of −5° C. or lower is not particularly limited, can be appropriately selected according to the purpose, and the mass ratio of the tackifier resin having a softening point of 80° C. or higher to the tackifier resin having a softening point of −5° C. or lower represented by [mass of the tackifier resin having a softening point of 80° C. or higher/mass of the tackifier resin having a softening point of −5° C. or lower] is preferably 5 to 50, and more preferably 10 to 30 when obtaining an adhesive tape achieving both excellent initial adhesiveness and excellent holding power.

The mass ratio of the styrene-based resin to the tackifier resin is not particularly limited and can be appropriately selected according to the purpose, and the mass ratio of the styrene-based resin to the tackifier resin represented by [styrene-based resin/tackifier resin] is preferably 0.5 to 10.0 and more preferably 0.6 to 9.0, because it is possible to improve initial adhesive strength and obtain excellent thermal durability. In addition, the mass ratio [styrene-based resin/tackifier resin] is preferably larger than 1, for example, to prevent peeling due to the repulsive force of the adhesive tape when it is attached to a curved surface portion of the adherend (repulsion resistance).

Urethane-Based Adhesive Resin

The urethane-based adhesive resin refers to an adhesive resin containing a urethane-based polymer as a base polymer. The urethane-based adhesive resin is typically formed of a urethane-based resin containing a urethane-based polymer obtained by reacting polyol and a polyisocyanate compound as a base polymer, and if necessary, an additive such as a tackifier resin or the like is contained. The urethane-based polymer is not particularly limited, and an appropriate urethane-based polymer from various urethane-based polymers that can function as the adhesive (ether-based polyurethane, ester-based polyurethane, carbonate-based polyurethane, and the like) can be used. Examples of the polyol include polyether polyol, polyester polyol, polycarbonate polyol, polycaprolactone polyol, and the like. Examples of the polyisocyanate compound include diphenylmethane diisocyanate, tolylene diisocyanate, hexamethylene diisocyanate, and the like. As the tackifier resin that can be contained in the urethane-based adhesive resin, the tackifier resins exemplified for the acrylic-based adhesive resin or the styrene-based adhesive resin can be used.

Other Components

The adhesive composition constituting the adhesive layer in the present embodiment can further contain other components in addition to the filler particles and the adhesive resin, if necessary. The other components in the adhesive layer are not particularly limited and can be appropriately selected as long as the characteristics of the adhesive tape are not impaired, and examples thereof include a polymer component other than the adhesive resin; an additive such as a crosslinking agent, an anti-aging agent, a UV absorber, a filler, a polymerization inhibitor, a surface modifier, an antistatic agent, a defoaming agent, a viscosity modifier, a light-resistant stabilizer, a weathering stabilizer, a heat-resistant stabilizer, an antioxidant, a leveling agent, an organic pigment, an inorganic pigment, a pigment dispersant, a plasticizer, a softener, a flame retardant, a metal deactivator, silica beads, or organic beads; an inorganic filler such as silicon oxide, aluminum oxide, titanium oxide, zirconia, and antimony pentoxide. These may be used alone or in a combination of two or more thereof.

The content of other components in the adhesive layer can be appropriately selected as long as the characteristics of the adhesive tape are not impaired.

The adhesive composition forming the adhesive layer may contain a crosslinking agent, if necessary, in addition to the adhesive resin described above. This is because the cohesive force of the adhesive layer can be increased by containing the crosslinking agent. The kind of the crosslinking agent is not particularly limited, and a well-known crosslinking agent of the related art can be appropriately selected and used. Examples of such a crosslinking agent include an isocyanate-based crosslinking agent, an epoxy-based crosslinking agent, an oxazoline-based crosslinking agent, an aziridine-based crosslinking agent, a melamine-based crosslinking agent, a peroxide-based crosslinking agent, a metal chelate-based crosslinking agent, and the like. The crosslinking agent may be used alone or in a combination of two or more thereof. Among these, from a viewpoint of improving the cohesive force, it is preferable to use an isocyanate-based crosslinking agent and an epoxy-based crosslinking agent. The specific isocyanate-based crosslinking agent is as described above. The amount of the crosslinking agent used is not particularly limited, and can be selected from 10 parts by mass or less, for example, approximately 0.005 to 10 parts by mass, and preferably approximately 0.01 to 5 parts by mass with respect to 100 parts by mass of the adhesive resin.

The adhesive composition for forming the adhesive layer may be foamable or may be in a foamed state. For this purpose, the adhesive composition can be provided with a foaming agent in the formulation. Extremely preferably, as the foaming agent, an expanded or expandable microballoon is used. However, the chemical foaming agents can be used alone or in combination with other foaming agents. The adhesive composition may foam or may be foamed physically, that is, by blending a gaseous or supercritical liquid substance or substance mixture.

Particularly, it is preferable that the foaming is carried out by blending a microballoon and then expanding it.

The "microballoon" is understood to be a micro hollow beads with an expandable thermoplastic polymer shell. These beads are filled with a liquid or a liquefied gas having a low boiling point. As the shell material, particularly, polyacrylonitrile, PVDC, PVC, or polyacrylate is used. As the liquid having a low boiling point, particularly, low alkane hydrocarbon, for example, isobutane or isopentane is suitable, and these are sealed in a polymer shell under pressure as a liquefied gas.

Particularly, an action of heat affects on the microballoon, thereby softening the polymer shell on an outer side. At the same time, the liquid foaming agent gas present in the shell changes to its gaseous state. In this case, the microballoon expands irreversibly and expands three-dimensionally. The expansion terminals in a case where an internal pressure and an external pressure become equal. Since the polymer shell is maintained, a closed cell type foam is obtained.

A wide variety of microballoons are commercially available and are distinguished by their size (diameter in the unexpanded state is 6 to 45 µm) and starting temperature required for their expansion (75 to 220° C.). An example of a commercially available microballoon is Akzo Nobel's Expancel (registered trademark) DU type (DU=dry unexpanded product).

The unexpanded microballoon is also available as a solid material or an aqueous dispersion liquid having a microballoon content of approximately 40% to 45% by mass, and is also available as a polymer bonding type microballoon (master batch), for example, a polymer bonding type microballoon having a microballoon concentration of approximately 65% by mass in ethyl vinyl acetate. Both the microballoon dispersion liquid and the master batch are suitable in a production method for foaming the adhesive composition.

The foamed adhesive composition can also be generated using a so-called pre-expanding microballoon. In this category, the expansion is already performed before it is mixed into the polymer matrix. The pre-expanded microburn is commercially available, for example, under the name of Dualite (registered trademark) or as typology Expancel xxx DE (dry expanded product) manufactured by Akzo Nobel.

In a case where the adhesive composition contains a microballoon, at least 90% of the total hollow space formed by the microballoon in the adhesive layer has a maximum diameter of preferably 20 to 75 µm and more preferably 25 to 65 µm. The "maximum diameter" is understood to be a maximum elongation of the microballoon in any spatial direction.

The diameter can be determined by observing an edge of the adhesive tape when it is frozen and cut at a magnification of 500 times with a scanning electron microscope (PEM). The diameter is visually determined from each of the individual microballoons.

In a case of the foaming with a microballoon, the microballoon can be supplied to a formulation as a batch, paste or as an uncut or cut powder. In addition, the microballoon can be present in a state of being suspended in a solvent.

The proportion of the microballoon in the adhesive composition is preferably 0.5% by mass to 2.5% by mass and more preferably 1.0% by mass to 2.0% by mass, based on the entire adhesive composition. The above numerical value is a value of unexpanded microballoon.

The adhesive composition may contain expandable micro-hollow beads in addition to the filler particles, and may contain non-expandable micro-hollow beads different from the filler particles, regardless of the inclusion of expandable micro-hollow beads. For the micro-hollow beads, it is only necessary that substantially all cavities containing gas are permanently closed by a dense film, and it does not matter whether a shell film is formed of only an elastic and thermoplastic elongation polymer mixture or formed of an elastic and non-thermoplastic (in a range of a temperature possible plastic processing) glass.

Examples of other beads that can be contained in the adhesive composition include polymer solid beads, glass hollow beads, glass solid beads, ceramic hollow beads, ceramic solid beads, and/or carbon solid beads ("carbon micrcoballoon").

The relative density of the adhesive composition (adhesive layer) when foamed is preferably 450 to 950 kg/m$^3$ and preferably 600 to 800 kg/m$^3$.

The relative density indicates a ratio of the density of the foamed adhesive composition to the density of the unfoamed adhesive composition of the same formulation. The relative density of the adhesive composition is preferably 0.20 to 0.99, more preferably 0.30 to 0.90, and particularly preferably 0.50 to 0.85.

(Adhesive Composition)

The adhesive layer can be formed by using an adhesive such as a water-based adhesive, a solvent-type adhesive, a hot-melt type adhesive, and an active energy ray-curable adhesive containing the adhesive composition. The water-based adhesive refers to an adhesive in which the adhesive composition (adhesive layer-forming component) is contained in a solvent containing water as a main component (water-based solvent), and typically includes adhesives called a water-dispersible adhesive (form in which at least some of the adhesive composition are dispersed in water), and the like. In addition, the solvent-type adhesive refers to a form in which the adhesive composition is contained in an organic solvent. The adhesive layer in the adhesive tape of the present embodiment is preferably formed by using the solvent-type adhesive, from a viewpoint of preferably achieving the adhesive properties such as the shear adhesive strength.

<Other Layers>

The adhesive tape of the present embodiment is not particularly limited, and other layers can also be appropriately provided according to the purpose, and examples thereof include a primer layer, an antistatic layer, a non-combustible layer, a decorative layer, a conductive layer, a heat conductive layer, a release layer, and the like.

<Shape, Characteristics, and the Like of Adhesive Tape>

The shape and dimensions of the adhesive tape of the present embodiment are not particularly limited as long as it includes the base material layer, and the adhesive layers on both sides of the base material layer, and examples thereof include an adhesive tape having a suitable shape and dimensions to be attached to a predetermined adherend (for example, punched adhesive tape) or a sheet-shaped long adhesive tape (for example, adhesive tape before being processed into a specific shape).

In addition, the adhesive tape of the present embodiment can be provided with a non-adhesive gripping region optionally, for example, to be attached to an adherend or peeled off from the adherend.

The thickness of the adhesive tape is not particularly limited and can be appropriately selected according to the thicknesses of the adhesive layer and the base material layer, and is preferably 15 μm to 800 μm, more preferably 30 μm to 540 μm, even more preferably 60 μm to 320 μm, particularly preferably 70 μm to 250 μm.

In the present specification, a "thickness of the adhesive tape" indicates an average value of measured values of thicknesses of random 5 points in the adhesive tape which are measured using TH-104, a thickness measuring machine for paper and film (manufactured by Tester Sangyo Co., Ltd.).

The hardness of the adhesive tape (type A hardness (shore A hardness)) is not particularly limited and can be appropriately selected according to the purpose, and is preferably 10 to 90, more preferably 20 to 85, and even more preferably 64 to 85. In a case where the shore A hardness of the adhesive tape is within the preferable range, it is easy to perform the re-peeling operation by peeling the adhesive tape off. On the other hand, in a case where the shore A hardness is less than 10, the adhesive tape may be torn when the adhesive tape is elongated and peeled off, and in a case where the shore A hardness exceeds 90, the stress for elongating excessively increases when attempting to elongate and re-peel the adhesive tape off, and accordingly, the re-peeling may not be performed.

The rubber hardness of the adhesive tape is Shore A hardness and indicates a value measured based on JIS K6253 using a durometer (spring type rubber hardness tester) (model name: GS-719G, manufactured by TECLOCK Co., Ltd.).

The stress at 25% elongation of the adhesive tape is preferably 0.15 MPa to 82 MPa, more preferably 0.15 MPa to 10 MPa, even more preferably 0.15 MPa to 5 MPa, and most preferably 0.15 MPa to 4.5 MPa. In a case where the stress at 25% elongation of the adhesive tape is 0.15 MPa to 82 MPa, it is possible to obtain an adhesive strength suitable for the adhesive tape and it is possible to comparatively easily peel the adhesive tape off even when it is elongated and peeled off. On the other hand, in a case where the stress at 25% elongation of the adhesive tape is less than 0.15 MPa, the adhesive tape may be peeled off, when a load is generated in the shear direction of the adhesive tape while fixing hard adherends. In addition, in a case where the stress at 25% elongation of the adhesive tape exceeds 82 MPa, when peeling the adhesive tape off, the force necessary to elongate the adhesive tape tends to be excessive.

The stress at 25% elongation of the adhesive tape indicates a stress value measured, in a case where the adhesive tape is punched into a dumbbell shape with a marked line length of 20 mm and a width of 5 mm, and pulled and elongated by 25% in a length direction at a tensile speed of 500 mm/min by using TENSILON tensile testing machine (model name: RTF-1210, manufactured by A & D Company, Limited) under conditions of a measurement atmosphere of 23° C. and 50% RH.

The breaking strength of the adhesive tape is not particularly limited and can be appropriately selected according to the purpose, and is preferably 20 MPa to 100.0 MPa, more preferably 20 MPa to 90.0 MPa, and even more preferably 30 MPa to 85.0 MPa, and particularly preferably 40 MPa to 85.0 MPa. In a case where the breaking strength of the adhesive tape is within the preferable range, it is possible to suppress the adhesive tape from being torn even when the adhesive tape is rapidly elongated and peeled off, and the load for elongating the adhesive tape does not excessively increase, and therefore the re-peeling operation by peeling is easily performed. On the other hand, in a case where the breaking strength of the adhesive tape is less than 20 MPa, the adhesive tape may be torn when the adhesive tape is rapidly elongated and peeled off, and in a case where the breaking strength thereof exceeds 100.0 MPa, the adhesive tape cannot be sufficiently elongated when attempting to elongate and re-peel the adhesive tape off, and accordingly, the re-peeling may not be performed. The force required to elongate and deform the adhesive tape depends even on a thickness of the adhesive tape. For example, even in a case where the adhesive tape is thick and the adhesive tape having high breaking strength is attempted to elongate to re-peel it off, the adhesive tape may not be sufficiently elongated and re-peeled off.

The breaking strength of the adhesive tape indicates a stress value measured, in a case where the adhesive tape is punched into a dumbbell shape with a marked line length of 20 mm and a width of 5 mm, and pulled and broken in a length direction at a tensile speed of 500 mm/min by using TENSILON tensile testing machine (model name: RTF-1210, manufactured by A & D Company, Limited) under conditions of a measurement atmosphere of 23° C. and 50% RH.

The breaking elongation of the adhesive tape is not particularly limited, can be appropriately selected according to the purpose, and is preferably 400% to 1,500%, more preferably 400% to 1,300%, and even more preferably 400% to 1,000%. In a case where the breaking elongation of the adhesive tape is 400% or more, even in a case where the adhesive tape is firmly adhered to the adherend, when re-peeling the adhesive tape, the stress for elongating it in a horizontal direction to a vertical direction with respect to the attachment surface of the adherend does not excessively increase, and the adhesive tape is not excessively elongated even when peeling off, thereby easily performing the peeling. In addition, in a case where the breaking elongation is 1,500% or less, when re-peeling the adhesive tape off, an elongation distance from the attachment surface of the adherend in the horizontal direction to the vertical direction does not excessively increase, and accordingly the operation can be performed in a small space. On the other hand, in a case where the breaking elongation is less than 400%, when re-peeling the adhesive tape off, the adhesive tape may not be peeled off due to the breaking when elongating and peeling the adhesive tape from the attachment surface of the adherend in the horizontal direction to the vertical direction, and in a case where the breaking elongation exceeds 1,500%, when re-peeling the adhesive tape, the elongation distance from the attachment surface of the adherend in the horizontal direction to the vertical direction excessively increases, thereby deteriorating workability.

The breaking elongation of the adhesive tape indicates a tensile elongation rate measured, in a case where the adhesive tape is punched into a dumbbell shape with a marked line length of 20 mm and a width of 5 mm, and pulled and broken in the length direction at the tensile speed of 500 mm/min by using TENSILON tensile testing machine (model name: RTF-1210, manufactured by A & D Company, Limited) under conditions of a measurement atmosphere of 23° C. and 50% RH.

The adhesive tape of the present embodiment can be peeled off even if it is pulled in a direction perpendicular to the attachment surface of the adherend (90° direction) under predetermined conditions. Specifically, the adhesive tape of the present embodiment is evaluated according to "evaluation of 90° elongation peeling (high speed)" described in a section of the examples which will be described later, and the result thereof may be "occurrence of cutting of the adhesive tape is 0 out of 3 times" or "occurrence of cutting of the adhesive tape was 1 out of 3 times and/or the area of the adhesive composition remaining on the adherend is less than 1/5 with respect to the initial attachment area". Since the adhesive tape has such physical properties, it is possible to more easily and rapidly remove it from the adherend.

The adhesive tape also has excellent impact resistance. The impact resistance can be found, for example, by a method described in "Evaluation of impact resistance" in a section of examples which will be described later. In the evaluation of impact resistance, a height of a striking core at which the adhesive tape is peeled off or broken can be appropriately selected as long as the effect of the present invention is not impaired, and it is preferably 30 cm or more, more preferably 40 cm or more, even more preferably 50 cm or more, and particularly preferably 60 cm or more. In a case where the height is less than 30 cm, sufficient impact resistance tends not to be obtained.

The 180° peeling adhesive strength of the adhesive tape is not particularly limited, can be appropriately selected according to the purpose, and is preferably 10 N/20 mm to 50 N/20 mm, more preferably 15 N/20 mm to 45 N/20 mm, and even more preferably 20 N/20 mm to 40 N/20 mm. In a case where the 180° peeling adhesive strength is within the preferable range, it is possible to easily peel the adhesive tape off when elongating and re-peeling the adhesive tape from the attachment surface of the adherend in the horizontal direction to the vertical direction, while having suitable adhesive strength without occurring peeling or displacement from the adherend.

The 180° peeling adhesive strength of the adhesive tape refers to a value measured based on JIS Z0237.

<Method for Producing Adhesive Tape>

In the present embodiment, the method for producing the adhesive tape is not particularly limited, and can be appropriately selected from well-known methods. The method for producing an adhesive tape of the present embodiment preferably includes an adhesive layer forming step, a base material layer forming step, and a laminating step, and further includes other layer forming steps, if necessary. In addition, the adhesive tape can also be produced by a multi-layer simultaneous forming step in which the adhesive layer forming step and the base material layer forming step are performed at the same time.

The adhesive layer forming step is not particularly limited as long as the adhesive layer can be formed, and can be appropriately selected according to the purpose, and for example, a method for forming an adhesive layer on a surface of a peeling sheet by a method such as a heat-press method, a casting method by extrusion molding, a uniaxial stretching method, a sequential secondary stretching method, simultaneous biaxial stretching method, an inflation method, a tube method, a calendar method, and a solution method is used. Among these, the casting method by extrusion molding and the solution method are preferable.

The peeling sheet is not particularly limited and can be appropriately selected according to the purpose, and for example, paper such as kraft paper, glassine paper, and high-quality paper; a resin film such as polyethylene, polypropylene (biaxially stretched polypropylene (OPP), uniaxial stretched polypropylene (CPP)), or polyethylene terephthalate (PET); laminated paper in which the paper and the resin film are laminated, and paper in which a peeling process of a silicone-based resin or the like is performed on one surface or both surfaces of the sheet subjected to a filling process with clay or polyvinyl alcohol, and the like. These may be used alone or in a combination of two or more thereof.

The base material layer forming step is not particularly limited as long as the base material layer can be formed, and can be appropriately selected according to the purpose, and examples thereof include a heat-press method, a casting method by extrusion molding, a uniaxial stretching method, a sequential secondary stretching method, a simultaneous biaxial stretching method, an inflation method, a tube method, a calendar method, and a solution method is used. These methods may be used alone or in a combination of two or more thereof. Among these, the casting method by extrusion molding, the inflation method, the tube method, the calendar method, and the solution method are preferable in order to impart suitable flexibility and elongation property to the base material layer.

The base material layer may be surface-treated in order to further improve the adhesiveness with the adhesive layer.

The surface treatment method is not particularly limited and can be appropriately selected from well-known methods as long as the characteristics of the adhesive tape are not impaired. Examples thereof include a sandblast method, a surface polishing/friction method, a corona discharge treatment method, a chromic acid treatment method, a flame treatment method, a hot air treatment method, an ozone treatment method, an ultraviolet irradiation treatment method, and an oxidation treatment method.

The laminating step is a step of laminating the base material layer and the adhesive layer. The method for laminating the base material layer and the adhesive layer is not particularly limited and can be appropriately selected from well-known methods, and for example, a method for laminating by pressurizing the adhesive layer in a state of being attached to the peeling sheet formed in the adhesive layer forming step and the base material layer is used.

<Use of Adhesive Tape>

Adhesive tapes can be suitably used for fixing parts and temporarily fixing parts in various industrial fields such as fixing metal plates constituting a comparatively large electronic devices such as a flat screen TV, home appliances, OA equipment, fixing of an exterior parts and a housing, and fixing of exterior parts or rigid parts of batteries to a comparatively small electronic devices such as a portable electronic terminal, a camera, a personal computer, labels displaying product information, and the like.

Hereinabove, the embodiment of the present invention has been described, but the adhesive tape of the present invention is not limited to the examples and can be appropriately modified.

EXAMPLES

Hereinafter, the present invention will be described in more detail with reference to the examples, and the present invention is not limited to the following examples.

The measurement and the evaluation of the adhesive tapes obtained in each example and comparative example were carried out based on the following method.

(1) Measurement of Breaking Strength and Breaking Elongation of Base Material Layer By punching each base material layer into a dumbbell shape with a marked line length of 20 mm and a width of 5 mm, and pulling it in a length direction at a tensile speed of 500 mm/min by using TENSILON tensile testing machine (model name: RTF-1210, manufactured by A & D Company, Limited) under conditions of a measurement atmosphere of 23° C. and 50% RH, the breaking strength and the breaking elongation of the base material layer was measured. The results are shown in Tables 1 and 2 below.

(2) Measurement of 100% Modulus of the Base Material Layer

By punching each base material layer into a dumbbell shape with a marked line length of 20 mm and a width of 5 mm, and pulling it in a length direction at a tensile speed of 500 mm/min by using TENSILON tensile testing machine (model name: RTF-1210, manufactured by A & D Company, Limited) under conditions of a measurement atmosphere of 23° C. and 50% RH, the stress value in a case where the base material layer was elongated 100% was measured. The results are shown in Tables 1 and 2 below.

(3) Measurement of Rubber Hardness

The type A hardness (shore A) of each adhesive tape was measured based on JIS K6253 using a durometer (spring type rubber hardness tester) (model name: GS-719G, manufactured by TECLOCK Co., Ltd.). The results are shown in Tables 1 and 2 below.

(4) Measurement of the Thickness of Base Material Layer

The thickness of any 5 points in the base material layer was measured using a TH-104 paper/film thickness measuring machine (manufactured by Tester Sangyo Co., Ltd.). The value obtained by averaging these measurement values was taken as the thickness of the base material layer. The results are shown in Tables 1 and 2 below.

(5) Measurement of Thickness of Adhesive Layer

After immersing the adhesive tape in liquid nitrogen for 1 minute, the adhesive tape is bent and split in liquid nitrogen using tweezers with a width direction of the adhesive tape as a fold, and a section for observing a split surface in the thickness direction of the adhesive tape was produced. After returning the section to room temperature in a desiccator, the section was fixed on a sample table so that an electron beam was incident perpendicular to the split surface, and the split surface was observed using an electron microscope (Miniscope (registered trademark) TM3030Plus, Hitachi High-Tech Corporation) was used. Based on the scale of the electron microscope, the thickness of the adhesive layer in the adhesive tape was measured at 10 points, and the arithmetic average value thereof was defined as the thickness of the adhesive layer. The thickness of the adhesive layer is a length measured from a surface on one side to a surface on the other side along a stacking direction. The results are shown in Tables 1 and 2 below.

(6) Measurement of Average Particle Diameter of Filler Particles

The average particle diameter of the filler particles was measured by using a measuring machine (microtrack) using a laser diffraction scattering method. The results are shown in Tables 1 and 2 below.

(7) Evaluation of 90° Elongation Peeling (High Speed)

Each adhesive tape was cut into a length of 60 mm and a width of 10 mm. From this, an aluminum plate (length: 150 mm, width: 50 mm, thickness of 2 mm, alloy number A1050) with a clean and smooth surface was attached on one surface of the adhesive tape under the conditions of an atmosphere of 23° C. and 50% RH in a state where a part of the adhesive tape having a length of 10 mm and a width of 10 mm was protruded as a gripper. Next, a clean and smooth acrylic plate (length: 150 mm, width: 50 mm, thickness: 2 mm, acrylite L, color tone: colorless manufactured by Mitsubishi Rayon Co., Ltd.) was attached to a surface on a side opposite to the surface of the adhesive tape to which the aluminum plate was attached, a laminated structure of the aluminum plate, the adhesive tape, and the acrylic plate was pressed by reciprocating and pressurizing with a roller while adding a load of 5 kg thereto, and a piece left for 3 days under the conditions of atmosphere of 23° C. and 50% RH was defined as a test piece.

Under the conditions of an atmosphere of 23° C. and 50% RH, the grip portion of the adhesive tape on the test piece was on the acrylic plate side with respect to the attachment surface of the adhesive tape, a load limiter was set to 15 N by using a TENSILON tensile testing machine (model name: RTF-1210, manufactured by A & D Company, Limited) in 90° direction (vertical direction), and the test piece was elongated at a speed of a tensile speed of 1,000 mm/min. At this time, a degree of occurrence of cutting of the adhesive tape and the degree of the adhesive composition remaining on the adherend (at least one of the aluminum plate and the acrylic plate) after the adhesive tape is peeled off was visually checked.

The test by the method was carried out three times, and the re-peeling property (vertical elongation peeling) was evaluated based on the following evaluation criteria. The results are shown in Tables 1 and 2 below.

[Evaluation Criteria]

A: The occurrence of cutting of the adhesive tape was 0 times out of 3 times.

B: The occurrence of cutting of the adhesive tape was 1 time out of 3 times and/or the area of the adhesive composition remaining on the adherend is less than 1/5 with respect to the initial attachment area.

C: The occurrence of cutting of the adhesive tape was 1 time out of 3 times, the adhesive tape was not elongated, and the area of the adhesive tape remaining on the adherend was 4/5 or more with respect to the initial attachment area.

D: The occurrence of cutting of the adhesive tape was 2 times or more out of 3 times and/or the adhesive tape was not elongated, and the re-peeling could not be performed.

A and B indicate that there is no problem in use.

(8) Evaluation of 90° Elongation Peeling (Low Speed)

In the "evaluation of vertical elongation peeling (high speed)", a tensile speed of the adhesive tape of 1,000 mm/min was changed to a tensile speed of 500 mm/min, and the same test was performed and evaluated. The results are shown in Tables 1 and 2 below.

(9) Evaluation of Impact Resistance

Figure 2:
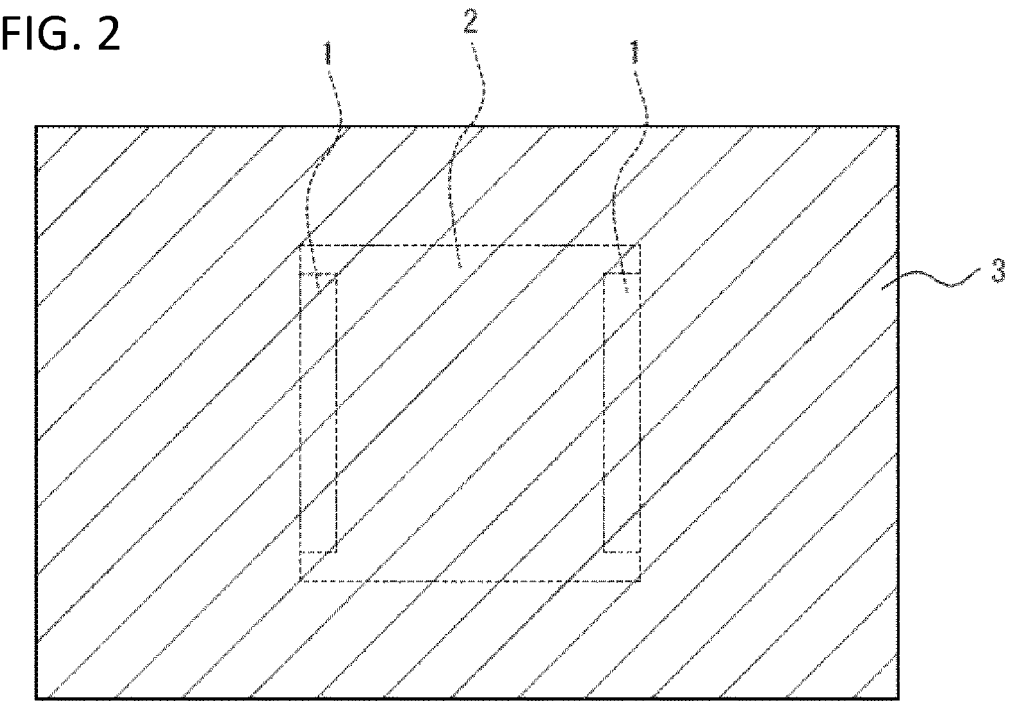
FIG. 2 is a schematic explanatory view of a test piece produced in a case of evaluating impact resistance in an example.

Two sheets of each adhesive tape cut into a length of 20 mm and a width of 5 mm were prepared. As shown in FIG. 1, adhesive tapes 1 were attached to an acrylic plate (length: 50 mm, width: 50 mm, thickness: 2 mm, acrylite L, color tone: colorless, manufactured by Mitsubishi Rayon Co., Ltd.) 2 in parallel with each other with an interval of 40 mm therebetween. Next, as shown in FIG. 2, the acrylic plate 2 to which the adhesive tape 1 was attached was attached to a center part of an ABS plate (length: 150 mm, width: 100 mm, thickness: 2 mm, Tough Ace R, manufactured by Sumitomo Bakelite Co., Ltd., hue: natural, no grain) 3, a laminated structure of the acrylic plate 2, the adhesive tape 1, and the ABS plate 3 was pressed by reciprocating and pressurizing with a roller while adding a load of 2 kg thereto, and a piece left for 24 hours under the conditions of atmosphere of 40° C. and 50% RH was defined as a test piece.

Figure 3:
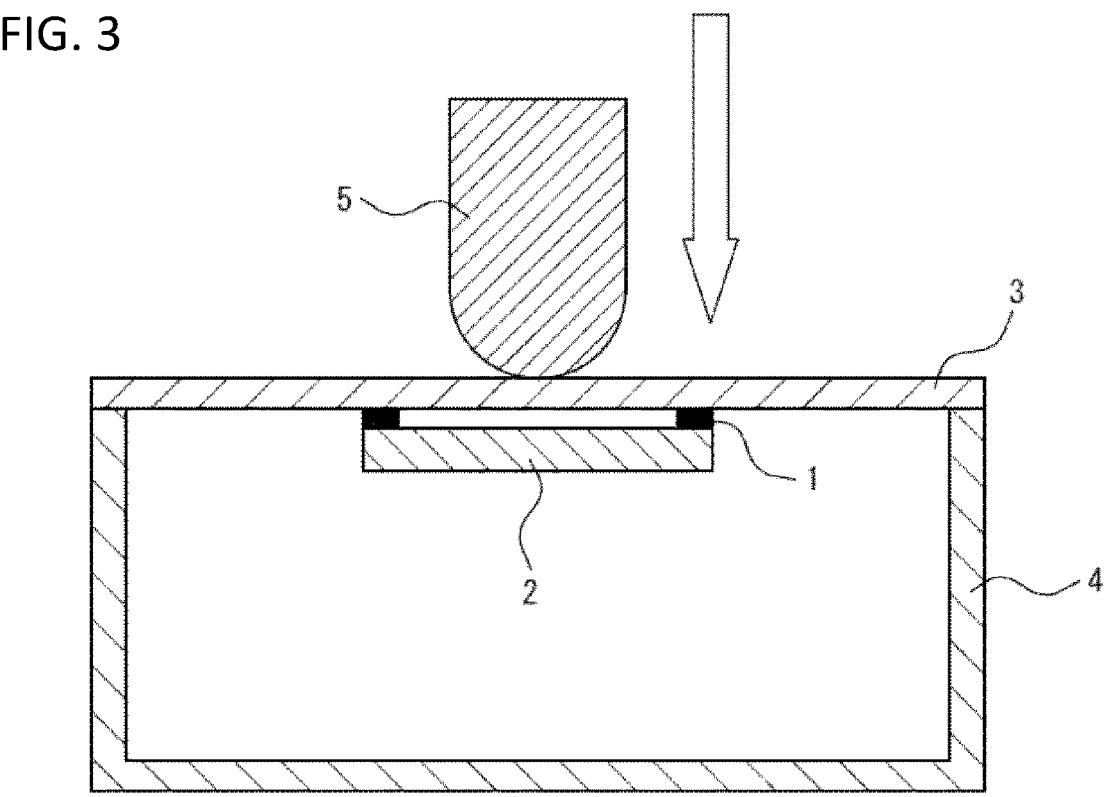
FIG. 3 is a schematic explanatory view of a method for installing a test piece on a U-shaped measurement table in a case of evaluating impact resistance in an example.

As shown in FIG. 3, a U-shaped measurement table (length: 150 mm, width: 100 mm, height: 45 mm, thickness: 5 mm made of aluminum) 4 was installed on a pedestal of the DuPont impact tester (manufactured by Tester Sangyo Co., Ltd.), and the test piece was placed thereon so that the acrylic plate 2 of the test piece was facing downward (FIG. 3). Under the conditions of an atmosphere of 23° C. and 50% RH, a stainless steel striking core (diameter: 25 mm, mass: 300 g) 5 was dropped from the ABS plate 3 side to a central portion of the ABS plate 3. At this time, while changing the height of the striking core 5 from 10 cm by 10 cm, the striking core 5 was dropped 5 times at intervals of 10 seconds for each height, and the height when the peeling or breaking of the adhesive tape on the test piece was observed was measured, and the impact resistance was evaluated based on the following evaluation criteria. The results are shown in Tables 1 and 2 below.

[Evaluation Criteria]
- A: When the striking core 5 was dropped from a height of 60 cm or more, the adhesive tape was not peeled off or broken.
- B: When the striking core 5 was dropped from a height of 30 cm to 50 cm, the adhesive tape was not peeled off or broken.
- C: When the striking core 5 was dropped from a height of 10 cm or more to less than 30 cm, the adhesive tape was peeled off or broken.
- D: When the height of the striking core 5 was 10 cm, the adhesive tape was peeled off or broken.

A and B indicate that there is no problem in use.

(10) Evaluation of 180° Peeling Adhesive Strength

The 180° peeling adhesive strength was measured based on JIS Z0237. Specifically, each adhesive tape was cut into a length of 150 mm and a width of 20 mm, and one surface of the adhesive tape was lined with a PET film having a thickness of 25 μm. Next, the other surface of the adhesive tape was attached to a stainless steel plate (length: 100 mm, width: 30 mm, thickness: 3 mm) under the condition of an atmosphere of 23° C. and 50% RH, a laminated structure of the adhesive tape and the stainless steel plate was pressed by reciprocating and pressurizing with a roller while adding a load of 2 kg thereto, and a piece left for 1 hour under the conditions of atmosphere of 23° C. and 50% RH was defined as a test piece.

The adhesive tape on the test piece was peeled off using TENSILON tensile testing machine (model name: RTF-1210, manufactured by A & D Company, Limited) in the 180° direction under the conditions of an atmosphere of 23° C. and 50% RH, at a speed of a tensile speed of 300 mm/min, and the 180° peeling adhesive strength of the adhesive tape was measured. The results are shown in Tables 1 and 2 below.

(11) Evaluation of Elongation Peeling (after Heating)

Each adhesive tape was cut into a length of 60 mm and a width of 10 mm. From this, a stainless steel plate 1 (length: 150 mm, width: 30 mm, thickness of 2 mm) with a clean and smooth surface was attached on one surface of the adhesive tape under the conditions of an atmosphere of 23° C. and 50% RH in a state where a part of the adhesive tape having a length of 10 mm and a width of 10 mm was protruded as a gripper. Next, a clean and smooth stainless steel plate 2 (length: 150 mm, width: 30 mm, thickness: 2 mm) was attached to a surface on a side opposite to the surface of the adhesive tape to which the stainless steel plate 1 was attached, a laminated structure of the stainless steel plate 1, the adhesive tape, and the stainless steel plate 2 was pressed by reciprocating and pressurizing with a roller while adding a load of 5 kg thereto, and a piece left for 10 minutes under the conditions of atmosphere of 200° C. was defined as a test piece.

After allowing to cool sufficiently to room temperature under the conditions of an atmosphere of 23° C. and 50% RH, the grip portion of the adhesive tape on the test piece was grasped by hand and elongated in the horizontal direction from the attachment surface of the adhesive tape. At this time, it was found whether the stainless steel plate 1 and the stainless steel plate 2 could be removed. The results are shown in Tables 1 and 2 below.

[Evaluation Criteria]
- A: The stainless steel plate 1 and the stainless steel plate 2 could be removed.
- B: The adhesive tape was cut and the stainless steel plate 1 and the stainless steel plate 2 could not be removed.

Subsequently, the materials and the like used in examples and comparative examples are as follows.

<Materials for Base Material>

—Materials for Base Material (1) (SEEPS)

3,000 mL of cyclohexane as a solvent and 9.2 mL of sec-butyllithium (cyclohexane solution) having a concentration of 10.5% by mass as an initiator were put into a pressure-resistant container which is dried and an atmosphere of which is substituted with nitrogen, heated to 60° C., and polymerized for 60 minutes by adding 100 mL of styrene.

After that, 270 mL of isoprene and 350 mL of butadiene were added at the same temperature, and then the reaction was allowed for 90 minutes. Subsequently, 100 mL of styrene was added at the same temperature and polymerized for 60 minutes, and then the polymerization was stopped with 0.52 mL of methanol, thereby obtaining a polymerized reaction solution containing a block copolymer.

29.3 g of palladium carbon (palladium carrying amount: 5% by mass) as a hydrogenation catalyst was added to this reaction mixture, and a hydrogenation reaction was carried out at a hydrogen pressure of 2 MPa and 150° C. for 10 hours. After allowing to cool and pressure discharge, palladium carbon was removed by filtration, the filtrate was concentrated, and further vacuum dried to obtain a material for a base material (1).

The obtained material for a base material (1) was a styrene-ethylene-ethylene/propylene-styrene block copolymer (hereinafter, may be referred to as "SEEPS") having the styrene content of 30% by mass, the weight average molecular weight of 98,000, the molecular weight distribution of 1.03, and the hydrogenation rate of 98%. In addition, the material for a base material (1) was dissolved in toluene to adjust the solid content to 20%, thereby obtaining a toluene solution of the material for a base material (1).

—Material for Base Material (2) (SEEPS)

3,000 mL of cyclohexane as a solvent and 9.2 mL of sec-butyllithium (cyclohexane solution) having a concentration of 10.5% by mass as an initiator were put into a pressure-resistant container which is dried and an atmosphere of which is substituted with nitrogen, heated to 60° C., and polymerized for 60 minutes by adding 100 mL of styrene.

After that, 300 mL of isoprene and 300 mL of butadiene were added at the same temperature, and then the reaction was allowed for 90 minutes. Subsequently, 100 mL of styrene was added at the same temperature and polymerized for 60 minutes, and then the polymerization was stopped with 0.52 mL of methanol, thereby obtaining a polymerized reaction solution containing a block copolymer.

29.3 g of palladium carbon (palladium carrying amount: 5% by mass) as a hydrogenation catalyst was added to this reaction mixture, and a hydrogenation reaction was carried out at a hydrogen pressure of 2 MPa and 150° C. for 10 hours. After allowing to cool and pressure discharge, palladium carbon was removed by filtration, the filtrate was concentrated, and further vacuum dried to obtain a material for a base material (2).

The obtained material for a base material (2) was a styrene-ethylene-ethylene/propylene-styrene block copolymer (SEEPS) having the styrene content of 30% by mass, the weight average molecular weight of 98,000, the molecular weight distribution of 1.02, and the hydrogenation rate of 98%. In addition, the material for a base material (2) was dissolved in toluene to adjust the solid content to 20%, thereby obtaining a toluene solution of the material for a base material (2).

—Material for Base Material (3) (SEEPS+MAM)

15 parts by mass of an acrylic-based block copolymer (methyl methacrylate-acrylate-methyl methacrylate block copolymer (MAM), clarity LA2330 manufactured by Kuraray Co., Ltd.) was collected with respect to 100 parts by mass of the solid content of the material for a base material (1), and diluted and mixed while being dissolved in toluene, thereby obtaining a toluene solution of a material for a base material (3) which is a mixture of SEEPS and MAM.

—Material for Base Material (4) (SIS)

As a material for a base material (4), a styrene-isoprene-styrene block copolymer (SIS) resin (Quintac 3620, manufactured by Zeon Corporation) was used. In addition, the material for a base material (4) was diluted with toluene to obtain a toluene solution of the material for a base material (4).

—Material for Base Material (5) (Urethane)

As a material for a base material (5), a film of an ester-based polyurethane compound (Mobilon film MF100T manufactured by Nisshinbo Textile Inc.) was used.

—Material for Base Material (6) (PET)

As a material for a base material (6), a film of polyethylene terephthalate (PET) (Lumilar-S10 manufactured by Toray Industries, Inc.) was used.

—Material for Base Material (7) (SEBS)

As a material for a base material (7), a styrene-ethylene-butadiene-styrene copolymer (SEBS) resin (Septon 8004, manufactured by Kuraray Co., Ltd.) was used. The material for a base material (7) had a styrene content of 31% by mass. In addition, the material for a base material (7) was adjusted to have the solid content to 20% using toluene, thereby obtaining a toluene solution of the material for a base material (7).

<Adhesive Composition>

The following filler particles were used as the filler particles contained in the adhesive composition in the present invention.

<<Filler Particles>>

—Filler Particles (1) (Silicone-Based Filler)

A silicone composite powder (KMP-601 manufactured by Shin-Etsu Chemical Co., Ltd., average particle diameter: 12 µm) was used as filler particles (1).

—Filler Particles (2) (Aluminum Hydroxide)

Aluminum hydroxide (manufactured by Nippon Light Metal Co., Ltd., BW153, average particle diameter: 18 µm) was used as filler particles (2).

—Filler Particles (3) (Silicone-Based Filler)

A silicone composite powder (KMP-602 manufactured by Shin-Etsu Chemical Co., Ltd., average particle diameter: 30 µm) was used as filler particles (3).

—Filler Particles (4) (Silicone-Based Filler)

A silicone composite powder (KMP-600 manufactured by Shin-Etsu Chemical Co., Ltd., average particle diameter: 5 µm) was used as filler particles (4).

<<Preparation of Adhesive Composition>>

—Adhesive Composition (1)

75.94 parts by mass of n-butyl acrylate, 5 parts by mass of 2-ethylhexyl acrylate, 15 parts by mass of cyclohexyl acrylate, 4 parts by mass of acrylate, 0.06 parts by mass of 4-hydroxybutyl acrylate, and 200 parts by mass of ethyl acetate were put into a reaction vessel equipped with a stirrer, a reflux cooling tube, a nitrogen introduction tube, a thermometer, and a dropping funnel, heated to 65° C. while blowing nitrogen under stirring, thereby obtaining a mixture (1). Next, 4 parts by mass (solid content 2.5% by mass) of a 2,2'-azobis isobutyronitrile solution previously dissolved in ethyl acetate was added to the mixture (1), and held at 65° C. for 10 hours under stirring, thereby obtaining a mixture (2). Next, the mixture (2) was diluted with 98 parts by mass of ethyl acetate and filtered through a 200 mesh wire net to obtain an acrylic copolymer solution (1) having the weight average molecular weight of 1,600,000 (converted in terms of polystyrene).

Next, 5 parts by mass of a polymerized rosin ester-based tackifier resin (D-125, Arakawa Chemical Industries, Ltd.) and 15 parts by mass of a petroleum-based tackifier resin (FTR (registered trademark) 6125 (manufactured by Mitsui Chemicals, Inc.) were mixed and stirred with respect to 100 parts by mass of the acrylic copolymer solution (1), and then ethyl acetate was added to obtain an adhesive resin solution (1) having the solid content of 35% by mass.

Next, 30 parts by mass of the filler particles (1) was added to 100 parts by mass of the solid content of the obtained adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the filler particles (1) based on 100 parts by mass of the adhesive resin solution (1), stirred and mixed so as to be uniform, and ethyl acetate was added, to obtain an adhesive composition (1) having the solid content of 40% by mass.

—Adhesive Composition (2)

50 parts by mass of the filler particles (2) was added to 100 parts by mass of the solid content of the adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the filler particles (2) based on 100 parts by mass of the adhesive resin solution (1), stirred and mixed so as to be uniform, and ethyl acetate was added to obtain an adhesive composition (2) having the solid content of 40% by mass.

—Adhesive Composition (3)

30 parts by mass of the filler particles 3 was added to 100 parts by mass of the solid content of the adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the filler particles (3) based on 100 parts by mass of the adhesive resin solution (1), stirred and mixed so as to be uniform, and ethyl acetate was added to obtain an adhesive composition (3) having the solid content of 40% by mass.

—Adhesive Composition (4)

30 parts by mass of the filler particles 4 was added to 100 parts by mass of the solid content of the adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the filler particles (4) based on 100 parts by mass of the adhesive resin solution (1), stirred and mixed so as to be uniform, and ethyl acetate was added to obtain an adhesive composition (4) having the solid content of 40% by mass.

—Adhesive Composition (5)

50 parts by mass of the filler particles 1 was added to 100 parts by mass of the solid content of the adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the filler particles (1) based on 100 parts by mass of the adhesive resin solution (1), stirred and mixed so as to be uniform, and ethyl acetate was added to obtain an adhesive composition (5) having the solid content of 40% by mass.

—Adhesive Composition (6)

75 parts by mass of the filler particles 1 was added to 100 parts by mass of the solid content of the adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the filler particles (1) based on 100 parts by mass of the adhesive resin solution (1), stirred and mixed so as to be uniform, and ethyl acetate was added to obtain an adhesive composition (6) having the solid content of 40% by mass.

Subsequently, the examples and comparative examples will be described.

Example 1

The adhesive composition (1) was applied on a release liner (film binar 75E-0010GT, manufactured by Fujimori Kogyo Co., Ltd., the same applies hereinafter) with an applicator so that the thickness after drying becomes 50 μm, and dried at 80° C. for 3 minutes to produce an adhesive layer.

Next, a toluene solution of the material for a base material (1) was applied on a release liner with an applicator so that the thickness after drying becomes 50 μm, and dried at 60° C. for 5 minutes to produce a base material layer.

After the release liner of the base material layer is peeled off, the adhesive layer from which the release liner was peeled off was attached to both surfaces of the base material layer, and a laminated structure of the base material layer and the adhesive layer was pressed at 0.2 MPa and laminated to produce an adhesive tape (1).

The obtained adhesive tape was evaluated by the method, and the results thereof are shown in Table 1.

Example 2

An adhesive tape (2) was produced by the same method as in Example 1, except that the adhesive composition (1) was changed to adhesive composition (2), in the production of the adhesive tape (1) of Example 1.

The obtained adhesive tape was evaluated by the method, and the results thereof are shown in Table 1.

Example 3

An adhesive tape (3) was produced by the same method as in Example 1, except that the base material layer was produced by changing the toluene solution of the material for a base material (1) to the toluene solution of the material for a base material (2) in the production of the adhesive tape (1) of Example 1.

The obtained adhesive tape was evaluated by the method, and the results thereof are shown in Table 1.

Example 4

An adhesive tape (4) was produced by the same method as in Example 1, except that the base material layer was produced by changing the toluene solution of the material for a base material (1) to the toluene solution of the material for a base material (3) in the production of the adhesive tape (1) of Example 1.

The obtained adhesive tape was evaluated by the method, and the results thereof are shown in Table 1.

Example 5

An adhesive tape (5) was produced by the same method as in Example 1, except that the adhesive composition (1) was changed to adhesive composition (3), in the production of the adhesive tape (1) of Example 1.

The obtained adhesive tape was evaluated by the method, and the results thereof are shown in Table 1.

Example 6

An adhesive tape (6) was produced by the same method as in Example 1, except that the adhesive composition (1) was changed to adhesive composition (4), in the production of the adhesive tape (1) of Example 1.

The obtained adhesive tape was evaluated by the method, and the results thereof are shown in Table 1.

Example 7

An adhesive tape (7) was produced by the same method as in Example 1, except that the adhesive composition (1) was changed to adhesive composition (5), in the production of the adhesive tape (1) of Example 1.

The obtained adhesive tape was evaluated by the method, and the results thereof are shown in Table 1.

Example 8

An adhesive tape (8) was produced by the same method as in Example 1, except that the base material layer was produced by changing the toluene solution of the material for a base material (1) to the toluene solution of the material for a base material (7) in the production of the adhesive tape (1) of Example 1.

The obtained adhesive tape was evaluated by the method, and the results thereof are shown in Table 1.

Comparative Example 11

An adhesive tape (9) was produced by the same method as in Example 1, except that the base material layer was produced by changing the toluene solution of the material for a base material (1) to the toluene solution of the material for a base material (4) in the production of the adhesive tape (1) of Example 1.

The obtained adhesive tape was evaluated by the method, and the results thereof are shown in Table 2.

Comparative Example 21

An adhesive tape (10) was produced by the same method as in Example 1, except that the base material layer was changed to material for a base material (5), in the production of the adhesive tape (1) of Example 1.

The obtained adhesive tape was evaluated by the method, and the results thereof are shown in Table 2.

Comparative Example 31

An adhesive tape (11) was produced by the same method as in Example 1, except that the thickness of the base material layer was changed to 300 μm, in the production of the adhesive tape (1) of Example 1.

The obtained adhesive tape was evaluated by the method, and the results thereof are shown in Table 2.

Comparative Example 41

An adhesive tape (12) was produced by the same method as in Example 1, except that the base material layer was changed to material for a base material (6), in the production of the adhesive tape (1) of Example 1.

The obtained adhesive tape was evaluated by the method, and the results thereof are shown in Table 2.

Comparative Example 51

An adhesive tape (13) was produced by the same method as in Example 1, except that the adhesive composition (1) was changed to adhesive composition (6), in the production of the adhesive tape (1) of Example 1.

The obtained adhesive tape was evaluated by the method, and the results thereof are shown in Table 2.

TABLE 1

| | | | Example 1 | Example 2 | Example 3 | Example 4 | Example 5 | Example 6 | Example 7 | Example 8 |
|---|---|---|---|---|---|---|---|---|---|---|
| Base material layer | Kind | — | Material for base material 1 (SEEPS) | Material for base material 1 (SEEPS) | Material for base material 2 (SEEPS) | Material for base material 3 (SEEPS + MAM) | Material for base material 1 (SEEPS) | Material for base material 1 (SEEPS) | Material for base material 1 (SEEPS) | Material for base material 7 (SEBS) |
| | Thickness | μm | 50 | 50 | 50 | 50 | 50 | 50 | 50 | 50 |
| | Breaking strength | MPa | 84 | 84 | 81 | 42 | 84 | 84 | 84 | 80 |
| | Breaking elongation | % | 775 | 775 | 805 | 550 | 775 | 775 | 775 | 720 |
| | 100% modulus | MPa | 3.4 | 3.4 | 2.9 | 2.5 | 3.4 | 3.4 | 3.4 | 3.2 |
| | Rubber hardness | A | 76 | 76 | 80 | 66 | 76 | 76 | 76 | 80 |
| Adhesive layer | Thickness | — | 50 | 50 | 50 | 50 | 50 | 50 | 50 | 50 |
| | Adhesive composition Kind | — | Adhesive composition 1 (acryl) | Adhesive composition 2 (acryl) | Adhesive composition 1 (acryl) | Adhesive composition 1 (acryl) | Adhesive composition 3 (acryl) | Adhesive composition 4 (acryl) | Adhesive composition 5 (acryl) | Adhesive composition 1 (acryl) |
| | Filler particles Kind | — | Filler particles 1 (silicone) | Filler particles 2 (aluminum hydroxide) | Filler particles 1 (silicone) | Filler particles 1 (silicone) | Filler particles 3 (silicone) | Filler particles 4 (silicone) | Filler particles 1 (silicone) | Filler particles 1 (silicone) |
| | Particle diameter | μm | 12 | 18 | 12 | 12 | 30 | 5 | 12 | 12 |
| | Content | % by mass | 22.8 | 33 | 22.8 | 22.8 | 22.8 | 22.8 | 33 | 22.8 |
| | Content | Parts by mass | 30 | 50 | 30 | 30 | 30 | 30 | 50 | 30 |
| | 90° elongation peeling (high speed) | — | A | B | A | A | A | A | A | A |
| | 90° elongation peeling (low speed) | — | A | B | B | B | B | B | B | B |
| | Elongation peeling (after heating) | — | B | B | B | B | B | B | B | B |
| | Impact resistance | | B | B | B | B | B | B | B | B |
| | Adhesive strength | N/20 mm | 22 | 20 | 22 | 22 | 20 | 25 | 21 | 22 |

TABLE 2

| Base material layer | Kind | | Comparative Example 1 | Comparative Example 2 | Comparative Example 3 | Comparative Example 4 | Comparative Example 5 |
|---|---|---|---|---|---|---|---|
| Base material layer | Kind | — | Material for base material 4 (SIS) | Material for base material 5 (urethane) | Material for base material 1 (SEEPS) | Material for base material 6 (PET) | Material for base material 1 (SEEPS) |
| | Thickness | μm | 50 | 50 | 300 | 50 | 50 |
| | Breaking strength | MPa | 14 | 33 | 84 | 150 | 84 |
| | Breaking elongation | % | 1200 | 720 | 775 | 115 | 775 |
| | 100% modulus | MPa | 2.5 | 5.5 | 3.4 | 145 | 3.4 |
| | Rubber hardness | A | 55 | 78 | 76 | 98 | 76 |
| Adhesive layer | Thickness | μm | 50 | 50 | 50 | 50 | 50 |
| | Adhesive composition Kind | — | Adhesive composition 1 (acryl) | Adhesive composition 1 (acryl) | Adhesive composition 1 (acryl) | Adhesive composition 1 (acryl) | Adhesive composition 6 (acryl) |
| | Filler particles Kind | — | Filler particles 1 (silicone) | Filler particles 1 (silicone) | Filler particles 1 (silicone) | Filler particles 1 (silicone) | Filler particles 1 (silicone) |
| | Particle diameter | μm | 12 | 12 | 12 | 12 | 12 |
| | Content | % by mass | 22.8 | 22.8 | 22.8 | 22.8 | 42.5 |
| | Content | Parts by mass | 30 | 30 | 30 | 30 | 75 |
| 90° elongation peeling (high speed) | | — | D | D | D | D | A |
| 90° elongation peeling (low speed) | | — | C | B | B | D | A |
| Elongation peeling (after heating) | | — | D | D | B | D | A |
| Impact resistance | | | A | C | B | D | D |
| Adhesive strength | | N/20 mm | 24 | 22 | 20 | 21 | 13 |

As shown in Tables 1 and 2, it is found that, in the examples in which the thickness was 10 to 100 μm, the breaking strength was 20 to 90 MPa, the breaking elongation was 400% to 1,500%, and the 100% modulus was 1 to 5 MPa, the 90° elongation peeling (high speed) and adhesive strength are excellent and accordingly it is possible to more easily and rapidly remove the adhesive tape of the examples from the adherend, compared to the comparative examples in which the values thereof are beyond the ranges. In addition, it was shown that the adhesive tape using SEEPS, SEEPS+MAM, and SEBS as the material for a base material is excellent in elongation peeling after heating.

INDUSTRIAL APPLICABILITY

According to the present invention, it is possible to provide an adhesive tape that can be removed from an adherend more easily and more rapidly.

REFERENCE SIGNS LIST

1: Adhesive tape
2: Acrylic plate
3: ABS plate
4: U-shaped measurement table
5: striking core

The invention claimed is:

1. An adhesive tape comprising:
a base material layer; and
adhesive layers formed of an adhesive composition provided on both sides of the base material layer,
wherein the base material layer has a thickness of 10 to 100 μm, a breaking strength of 30 to 90 MPa, a breaking elongation of 400% to 1,500%, and a 100% modulus of 1 to 5 MPa, and
the adhesive composition comprises:
an adhesive resin; and
1% to 40% by mass of filler particles having an average particle diameter of 0.1 to 40 μm with respect to 100% by mass of the adhesive composition.

2. The adhesive tape according to claim 1, wherein the base material layer has a rubber hardness of 60 to 90 A.

3. The adhesive tape according to claim 1, wherein the base material layer has the breaking elongation of 400% to 1,000%.

4. The adhesive tape according to claim 1, wherein the base material layer contains a styrene-based block copolymer or a hydrogenated product of the styrene-based block copolymer.

5. The adhesive tape according to claim 4, wherein the base material layer consists of a hydrogenated product of the styrene-based block copolymer.

6. The adhesive tape according to claim 1,
wherein the base material layer contains a hydrogenated product of a block copolymer configured with at least a hard segment X and a soft segment Y, and
the soft segment Y in the hydrogenated product is configured with a random copolymer of a linear structural unit and a structural unit having a side chain.

7. The adhesive tape according to claim 1,
wherein the base material layer contains a hydrogenated product of a block copolymer configured with at least a polymer block (A) and a polymer block (B),
the polymer block (A) has a structural unit derived from a styrene-based compound as a main component, and
the polymer block (B) is a block configured with a random copolymer of a linear hydrogenated butadiene structural unit (b1) and a hydrogenated isoprene structural unit having a side chain (b2).

8. The adhesive tape according to claim 1,
wherein the base material layer contains a styrene-ethylene/butadiene-styrene copolymer (SEBS) or a styrene-ethylene-ethylene/propylene-styrene block copolymer (SEEPS) as a main component.

9. The adhesive tape according to claim 1,
wherein the filler particles have the content of 3.5% to 40% by mass with respect to 100% by mass of the adhesive composition.

10. The adhesive tape according to claim 1, wherein the adhesive tape has a 180° peeling adhesive strength of 15 N/20 mm to 45 N/20 mm.

11. The adhesive tape according to claim 1, wherein the filler particles has a particle size distribution (D90/D10) of 2.5 to 20.

12. The adhesive tape according to claim 1, wherein the adhesive resin is one selected from the group consisting of an acrylic-based adhesive resin, a rubber-based adhesive resin, and a urethane-based adhesive resin.

13. The adhesive tape according to claim 1, wherein the adhesive resin can be peeled off from an adherend by an attempt to elongate.

* * * * *